United States Patent
Harrison, III et al.

(10) Patent No.: US 6,848,099 B2
(45) Date of Patent: Jan. 25, 2005

(54) METHOD AND SYSTEM FOR BIDIRECTIONAL BITWISE CONSTANT PROPOGATION BY ABSTRACT INTERPRETATION

(75) Inventors: Williams Ludwell Harrison, III, Brookline, MA (US); Cotton Seed, Brookline, MA (US)

(73) Assignee: Intel Corporation, Santa Clara, CA (US)

( * ) Notice: Subject to any disclaimer, the term of this patent is extended or adjusted under 35 U.S.C. 154(b) by 398 days.

(21) Appl. No.: 09/975,859

(22) Filed: Oct. 11, 2001

(65) Prior Publication Data

US 2003/0167462 A1 Sep. 4, 2003

(51) Int. Cl.$^7$ ................................................ G06F 9/45
(52) U.S. Cl. ..................... 717/154; 717/127; 717/151
(58) Field of Search ................................. 717/127, 141, 717/151, 154

(56) References Cited

PUBLICATIONS

Bourdoncle, Francois, "Assertion–Based Debugging of Imperative Programs by Abstract Interpretation", Digital Paris Research Laboratory, 85, avenue Victor Hugo, 92500 Rueil–Malmaison—France, bourdoncle@prl.dec.com, pp. 16.

Cousot, Patrick, "The Abstract Interpretation Perspective", ACM Workshop on Strategic Directions in Computing Research, MIT Laboratory for Computer Science, Cambridge, Massachusetts, USA, Jun. 14–15, 1996, pp. 1–8.

Cousot, Patrick, "Abstract Interpretation", http://www.ens.fr/_cousot, ACM Computing Surveys, vol. 28, No. 2, pp. 324–328, Jun. 1996.

Cousot, Patrick, "Abstract Interpretation: Achievements and Perspectives", Proceedings of the SSGRR 2000 Computer & eBusiness International Conference, Compact disk paper 224, L'Aquila, Italy, Jul. 31–Aug. 6, 2000. Scuola Superiore G. Reiss Romoli, pp. 1–7.

Cousot, Patrick, et al., "Abstract Interpretation And Applications to Logic Programs", Journal of Logic Programming, 13(2–3):103–179, 1992.

Coursot, Patrick, "Abstract Interpretation Based Static Analysis Parameterized by Semantics", Proceedings of the 4th International Symposium on Static Analysis, SAS'97, Paris, France, Sep. 8–10, 1997, P. van Hentenryck (Ed.), Lecture Notes in Computer Science 1302, Springer–Verlag, pp. 388–394.

Coursot, Patrick, et al., "Abstract Interpretation Frameworks", Journal of Logic and Computation, 2(4):511–547, Aug. 1992.

Coursot, Patrick, et al., "Abstract Interpretation of Algebraic Polynomial Systems" (Extended Abstract), In M. Johnson, editor, Proceedings of the Sixth International Conference on Algebraic Methodology and Software Technology, AMAST'97, Sydney, Australia, Lecture Notes in Computer Science 1349, pp. 138–154, Springer–Verlag, Berlin, Germany, Dec. 13–18, 1997.

(List continued on next page.)

*Primary Examiner*—Jack Lane
(74) *Attorney, Agent, or Firm*—Blakely, Sokoloff, Taylor & Zafman LLP

(57) ABSTRACT

A method and system for bidirectional bitwise constant propogation by abstract interpretation is disclosed. In one embodiment, the method performs optimizing an implementation of a programming language, comprising; analyzing one or more values computed by a program written in the programming language, wherein analyzing one or more values comprises; representing each bit within a value of the one or more values as an abstract element of a lattice having a set of abstract elements including $0_A$, $1_A$, $\perp_A$ and $T_A$, wherein the lattice is an abstraction of a concrete domain containing 0, 1, and $\perp$; analyzing one or more output bits that are produced by an operation in terms of one or more input bits that are input to the operation; and analyzing the input bits that are input to the operation in terms of the output bits that are produced by the operation.

27 Claims, 5 Drawing Sheets-

OTHER PUBLICATIONS

Coursot, Patrick, Asychronous Iterative Methods For Solving A Fixed Point System of Monotone Equations in a Complete Lattice, In Research Report R.R. 88, Laboratoire IMAG, University of Grenoble, France. 15 pages. Sep. 1977.

Coursot, Patrick, et al., "Automatic Discovery of Linear Restraints Among Variables of a Program", In Conference Record of the Fifth Annual ACM SIGPLAN–SIGACT Symposium on Principles of Program ming Languages, pp. 84–97, Tuscon, Arizona, 1978. ACM Press, New York, NY, USA.

Coursot, Patrick, et al., "Automatic Synthesis of Optimal Invariant Assertions: Mathematical Foundations", In Proceedings of the ACM Symposium on Artificial Intelligence & Programming Languages, 1977, Rochester, NY, USA. SIGPLAN Notices, vol. 12, Nb 8, Aug. 15–17, 1977, pp. 1–12; SIGART Newsletter, No. 64, Aug. 15, 17, 1977, pp. 1–12; ACM Press, New York, NY, USA.

Coursot, Patrick, et al., "Abstract Interpretation: a Unified Lattice Model For Static Analysis of Programs by Construction of Approximation of Fixpoints", In Conference Record of the Fourth Annual ACM SIGPLAN–SIGACT Symposium on Principles of Programming Languages, pp. 238–252, Los Angeles, California, 1977. ACM Press, New York, NY, USA.

Coursot, Patrick, "Constructive Design of a Heirarchy of Semantics of a Transition System by Abstract Interpretation" (Extended Abstract), Electronic Notes in Theoretical Computer Science, 6 (1997) URL: http://www.elsevier.nl/locate/entcs/volume6.html, 25 pages.

Coursot, Patrick, et al., "Refining Model Checking by Abstract Interpretation", Automated Software Engineering Journal, special issue on Automated Software Analysis, 6(1):69–95, 1999.

Coursot, Patrick, et al., "Relational Abstract Interpretation of High–Order Functional Programs" (Extended Abstract). Actes JTASPEFL'91, Bordeaux, Oct. 9–11, 1991, in BIGRE, No. 74, pp. 33–36, IRISA, Rennes, France, 1991.

Coursot, Patrick, et al., "Static Determinants of Dynamic Properties of Generalized Type Unions", In Proceedings of an ACM Conference on Language Design for Reliable Software, D. Wortman (Ed.), Mar. 28–30, 1977, Raleigh, NC, USA. SIGPLAN Notices, vol. 12, Nb3, Mar. 1977, pp. 77–94, ACM Press, New York, NY, USA.

Coursot, Patrick, et al., "Static Determination of Dynamic Properties of Programs", In B. Robinet, editor, Proceedings of the second international symposium on Programming, Paris, France, pp. 106–130, Apr. 13–15, 1976, Dunod, Paris.

Coursot, Patrick, et al., "Static Verification of Dynamic Type Properties of Variables", Research Report RR. 25, Laboratoire IMAG, University of Grenoble, France. 18 pages. Nov. 1975.

Coursot, Patrick, et al., "Temporal Abstract Interpretation", Conference Record of the 27th ACM SIGACT–SIGMOD–SIGART Symposium on Principles of Programming Languages, Boston, Mass., Jan. 19–21, 2000. ACM Press, New York, U.S.A. pp. 12–25.

Coursot, Patrick, "The Calculation Design of a Generic Abstract Interpreter", Course notes for the NATO International Summer School 1998 on Calculation System Design. Marktoberdorf, Germany, Jul. 28–Aug. 9, 1998, organized by F.L. Bauer, M. Broy, E.W. Dijkstra, D. Gries and C.A.R. Hoare, pp. 1–88.

Coursot, Patrick, "Types as Abstract Interpretations" (Invited Paper), Conference Record of the 24th ACM SIGACT–SIGMOD–SIGART Symposium on Principles of Programming Languages, Paris, France, Jan. 15–17, 1997. ACM Press, New York, U.S.A. pp. 316–331.

Hunt, Sebastian, "Abstract Interpretation of Functional Languages: From Theory to Practice", University of London, Imperial College of Science, Technology and Medicine, Department of Computing, A thesis submitted for the degree of Doctor of Philosophy of the University of London, Oct. 1991, pp. 1–166.

Coursot, Patrick, et al., "Static Determination of Dynamic Properties of Recursive Procedures", in IFIP Conference on Formal Description of Programming Concepts, E.J. Neuhold, (Ed.), pp. 237–277, St–Andrews, N.B., Canada, 1977. North–Holland Publishing Company 1978).

Giacobazzi, Roberto, et al., "Making Abstract Interpretations Complete", Universita Di Pisa, Dipartimento Di Informatica, Technical Report: TR–97–22, Nov. 3, 1997, ADDR: Corso Italia 40,56125 Pisa, Italy, pp. 1–44.

Verbrugge, Clark, et al., "Generalized Constant Propagation A Study in C", {clump, phaedrus, hendren} @cs.mcgill.ca, School of Computer Science, McGill University, Montreal, Quebec, Canada H3A 2A7, In Proceedings of the 1996 International Conference on Compiler Construction (CC '96), Linkoping, Swenden, Apr. 24–26, 1996, LNCS 1060, Springer–Verlag, Copyright(c) 1996 Clark Verbrugge, Laurie Hendren, Phong Co. pp. 16.

Cousot, Patrick, et al., "Abstract Interpretation Based Program Testing", Proceedings of the SSGRR 2000 Computer & eBusiness International Conference, Compact disk paper 248, L'Aquila, Italy, Jul. 31–Aug. 6, 2000. Scuola Superiore G. Reiss Romoli, pp. 1–10.

METHOD AND SYSTEM FOR BIDIRECTIONAL BITWISE CONSTANT PROPOGATION BY ABSTRACT INTERPRETATION

FIELD OF THE INVENTION

This invention relates to computer software programming language implementation systems, and more specifically to a computer software programming language implementation system that performs bidirectional bitwise constant propogation by abstract interpretation.

BACKGROUND OF THE INVENTION

There are several areas in which compiler optimization literature exists within the field of computer software programming language implementation systems. Well-known techniques for optimizing compilation use abstract interpretation based static analysis. The most important work in this field is the extensive work of Patrick and Radhia Cousot, and the derivative and related work of Samson Abramsky, Chris Hankin, Alan Mycroft, Flemming, and Nielson. This body of work is primarily foundational in nature, and does not emphasize the application of the techniques in a practical setting, e.g., an optimizing C compiler. Among applications of abstract interpretation, the most nearly related is the work on strictness analysis, which is a technique in which functions are analyzed to discover when they are strict in (dependent upon) their arguments in the sense that a nonterminating argument computation will mean non-termination of the function as a whole. This notion of strictness is closely related to the definition of Boolean operations on undefined values, in that it provides for defined results in the presence of undefined inputs. However, the setting of strictness analysis is quite different because strictness analysis pertains to functional programs whose values are higher order types in the lambda calculus (where non-termination is a routine feature of computations).

Another area in which compiler optimization literature exists is constant propagation. In addition to classic results, based on dataflow analysis, outlined in compiler texts like Aho and Ullman, and Muchnick, Wegman and Zadeck have developed a conditional constant propagation algorithm, and several refinements of their technique have been reported. Various algorithms based on value numbering are concerned with the analysis of values at compile time.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

DETAILED DESCRIPTION

Figure 1:
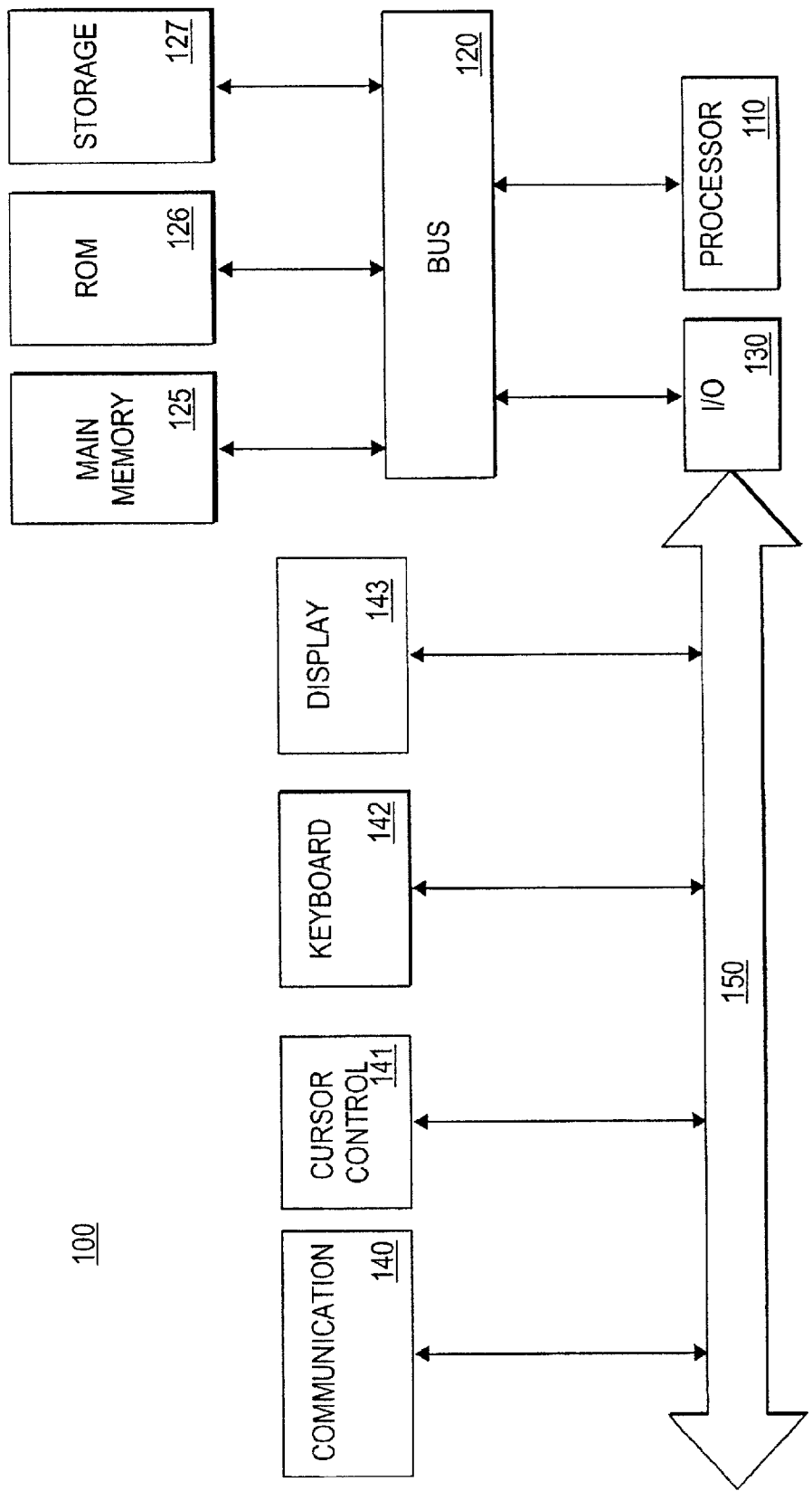
FIG. 1 illustrates a computer system representing an integrated multi-processor, in which elements of the present invention may be implemented.

A method and system for bidirectional bitwise constant propogation by abstract interpretation is disclosed. In one embodiment, the method performs optimizing an implementation of a programming language, comprising; analyzing one or more values computed by a program written in the programming language, wherein analyzing one or more values comprises; representing each bit within a value of the one or more values as an abstract element of a lattice having a set of abstract elements including $0_A$, $1_A$, $\perp_A$ and $T_A$, wherein the lattice is an abstraction of a concrete domain containing 0, 1, and $\perp$; analyzing one or more output bits that are produced by an operation in terms of one or more input bits that are input to the operation; and analyzing the input bits that are input to the operation in terms of the output bits that are produced by the operation.

In the following description, for purposes of explanation, specific nomenclature is set forth to provide a thorough understanding of the present invention. However, it will be apparent to one skilled in the art that these specific details are not required in order to practice the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Numerous compiler optimizations are driven by information concerning the values that are computed by a program, including which values are constant and, if so, what their values are. The discovery of such information is called constant propagation. The present method and system moves beyond traditional constant propagation in that: it analyzes computations at the level of individual bits, so that a value may be discovered to be partially constant, i.e., constant in some bits but not in others; and discovers that individual bits are undefined or unused by a program, with powerful consequences for optimization.

The present method may be performed efficiently on entire programs, provided that an alias analysis is available which partitions the memory accesses of the program into equivalence classes based on potential overlap. It requires essentially no type information from the program, and hence may be performed on high-level languages, assembly language, and machine code alike. The present method and system may be used to solve many problems, such as:

constant folding (replacing computations by their constant values);

dead code elimination (elimination of unused compuations);

elimination of undefined computations;

algebraic simplification;

determination of alignment of memory addresses; and semantics-preserving demotion of integer arithmetic to smaller precision (as a step towards vectorization using MMX-like instructions, for example).

The present method and system is presented as an instance of abstract interpretation, a technique whereby a formal correspondence between the actual semantics of a program and the semantics assigned to it under a program analysis is constructed. The reason for this rather theoretical exposition is that the present method and system is a family of methods rather than a single method; the family members have in common that they are all approximations of a limit that is given by the concrete semantics presented below FIG. 1 illustrates a computer system 100 representing an integrated multi-processor, in which elements of the present invention may be implemented. One embodiment of computer system 100 comprises a system bus 120 for communicating information, and a processor 110 coupled to bus 120 for processing information. Computer system 100 further comprises a random access memory (RAM) or other dynamic storage device 125 (referred to herein as main memory), coupled to bus 120 for storing information and instructions to be executed by processor 110. Main memory 125 also may be used for storing temporary variables or other intermediate information during execution of instructions by processor 110. Computer system 100 also may include a read only memory (ROM) and/or other static storage device 126 coupled to bus 120 for storing static information and instructions used by processor 110.

A data storage device 127 such as a magnetic disk or optical disc and its corresponding drive may also be coupled to computer system 100 for storing information and instructions. Computer system 100 can also be coupled to a second I/O bus 150 via an I/O interface 130. A plurality of I/O devices may be coupled to I/O bus 150, including a display device 143, an input device (e.g., an alphanumeric input device 142 and/or a cursor control device 141). For example, video news clips and related information may be presented to the user on the display device 143.

The communication device 140 is for accessing other computers (servers or clients) via a network. The communication device 140 may comprise a modem, a network interface card, or other well known interface device, such as those used for coupling to Ethernet, token ring, or other types of networks.

Figure 2:
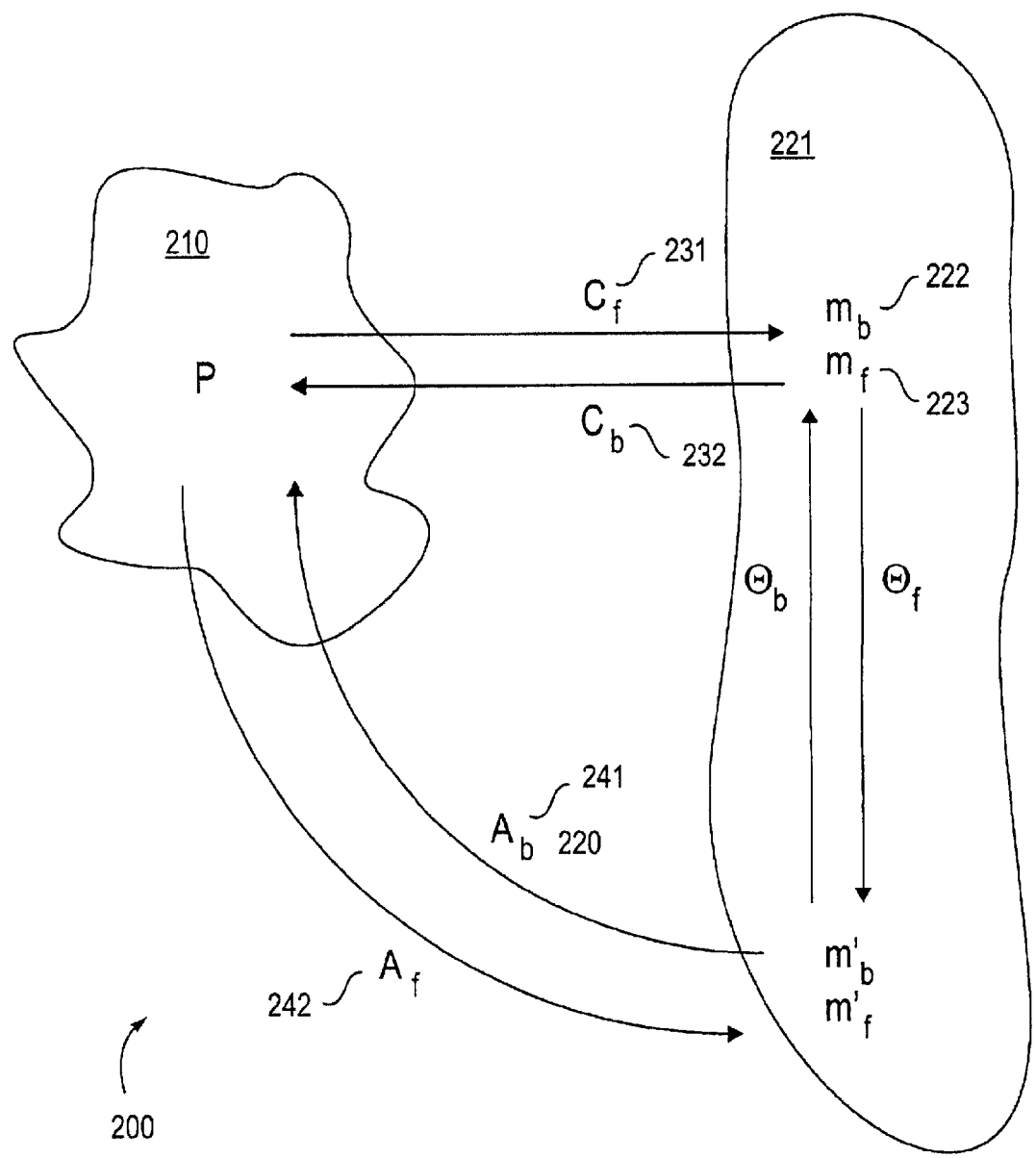
FIG. 2 illustrates an exemplary representation of the components of the present system and method.
Figure 3:
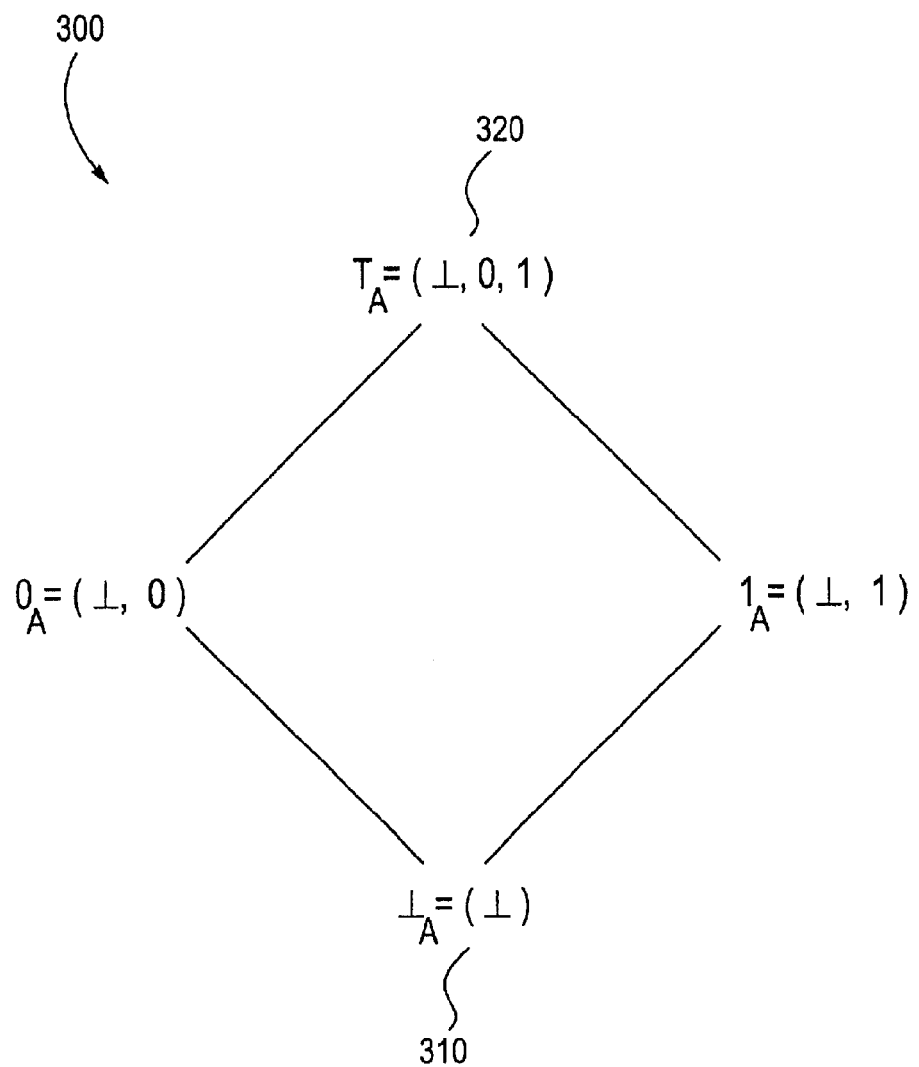
FIG. 3 illustrates a representation for the abstract domain 220 that facilitates efficient program analysis using the abstract semantics $A_b$ 241 and $A_f$ 242.

FIG. 2 illustrates an exemplary representation of the components of the present system and method, namely:

A concrete domain 210 which gives a meaning to values represented in binary form;

An abstract domain 220 which approximates the concrete domain 210 and which is appropriate for compile-time analysis of programs;

A concrete forward $C_f$ 231 and backward $C_b$ 252 semantics for basic operations on binary representations which describes their meaning in terms of the concrete domain 210; and An abstract forward $A_f$ 242 and backward $A_b$ 241 semantics for the same operations which describes their meaning in terms of the abstract domain 220:

A method for computing the abstract backward semantics 241 of arbitrary boolean functions;

A representation of an abstract domain 220, illustrated in FIG. 3, that facilitates efficient program analysis using the abstract semantics $A_b$ 241 and $A_f$ 242.

A method for computing an abstract forward $M_f$ 223 and backward meaning $M_b$ 224 from a program in a compiler intermediate language;

The present method allows a number of powerful program transformations and optimizations to be performed within an optimizing compiler, assembler, or post-link (executable) optimizer.

The present method and system makes several improvements over existing methods for constant propagation:

it provides constant information at the level of individual bits for a wide class of programs and operations. This effectively enriches the notion of constant value to include many computations that are considered nonconstant by alternate approaches;

it provides both forward (production) and backward (consumption) information concerning constants. The backward information enables new classes of dead code elimination, algebraic simplification, demotion for vectorization, and other optimizations;

it can be performed efficiently, in terms of both space and time; and it is easily adapted to the analysis of assembly language and object code.

The syntax x⊑y indicates that x and y are partially ordered; the partial order in question will be made clear by the context. A partial order is a relation, signified herewith by "⊑," that is transitive: x⊑y and y⊑z implies x⊑z.

reflexive: x⊑x is always true.

antisymmetric: (x⊑y) implies that either x=y or not(y⊑x)

For example, the relation "is a divisor of" is a partial order for positive integers. So is "less or equal" for integers. If each element is a set, then the relation "is a subset of" is a partial order. The ordering is "partial" because not all pairs of elements can be compared. For example, 2 is not a divisor of 3, nor vice-versa. When dealing with a partial order, for any two elements x or y, one of the following four situations hold:

x=y is true
x⊑y is true but y⊑x is false
y⊑x is true but x⊑y is false
both x⊑y and y⊑x are false.

In the last case, we say the values are "incomparable".

Returning to FIG. 3, the symbol ⊥ indicates the bottom element of a lattice; it represents the least element in the partial order defined by the lattice. The symbol T 320 to denote the top element of a lattice, when it exists. It will represent the greatest element in the partial order defined by the lattice. The syntax x⊔y represents the least upper bound of x and y, and x⊓y represents the greatest lower bound of x and y.

Concrete Domain

Figure 4:
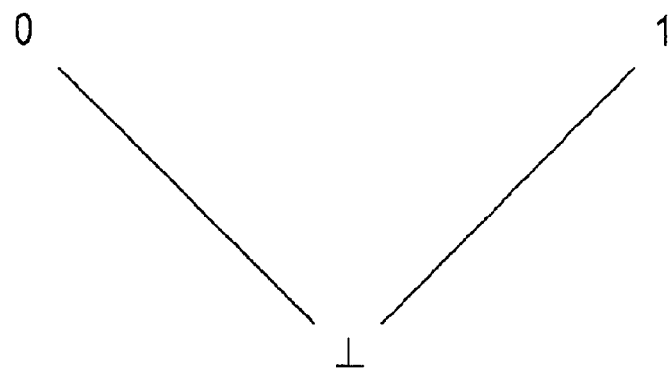
FIG. 4 illustrates an exemplary concrete domain according to one embodiment of the present invention.

FIG. 4 illustrates an exemplary concrete domain according to one embodiment of-the present invention. Consider a datum in binary form as computed by a running computer program. Each bit of the datum may have been assigned a definite value, either 0 or 1, by the program, or else its value may be undefined, (⊥) having been assigned no definite value by the program. As an example of the latter, consider this example C program, and assume that unsigned integers have 32 bits:

unsigned x;
x=(x & 0x0000FFFF)|0x12340000;
x=(y & 0xFFFF0000)|0x00005678;

In this example, all 32 bits of x are initially undefined, that is, they have been assigned no definite value by the program. The upper 16 bits of x are assigned definite values by the first assignment, but the lower 16 bits remain undefined. Following the second assignment, all 32 bits of x are fully defined. This program is not intended to conform to any standard. In an alternate embodiment x may be declared to be a structure with two bit field members, each having 16 bits, in which case the two assignments may be seen as giving values to the members of x.

Just as a bit may be undefined by the computation that produces it, so a bit may be unused by the computation that consumes it. Consider for example this program, and continue to assume that integers have 32 bits:

int a, b, c, d, e;
a=1;
b=2;
c=a+b;
d=c<<16;
e=c & 0x0000FFFF;

In this example, c is assigned the 32-bit sum of a and b. The upper 16 bits of c are unused by the assignment to d, which shifts them away. They are likewise unused by the assignment to e, which masks them away. This example illustrates that many operations are insensitive to the values of some bits of their inputs, in that they would produce an equivalent output even if the values of those bits in their inputs were undefined.

A computation is unaffected by bits that are undefined or unused by it. A bit that is defined but unused by a computation may be replaced by an undefined bit without changing the result of the computation. A bit that is used but undefined by a computation may (depending on the applicable language standard) render the computation itself, in whole or in part, undefined or illegal and therefore eligible for elimination or transformation.

At any moment during a computation, it may be asked of any bit what value has been assigned to it by the computation to this point, and what value will be demanded of it by the remaining computation. The former is referred to as the forward value of the bit and the latter as the backward value of the bit respectively. The portion of the computation that produces the bit being examined is the prefix of the computation, and the portion of the computation that consumes the bit is the continuation of the computation. The possibilities for each bit can be summarized by the lattice 400 of FIG. 4.

The bottom element here, symbolized by ⊥, represents an undefined bit in the case of a forward value, and an unused bit in the case of a backward value. The partial order defined by the lattice is information content. That is, more information is put into a fully-defined (0 or 1) bit by the program than is put into an undefined bit. In the backward sense, more information is demanded of a bit that is used than is demanded of a bit that is unused.

The domain above associates a value of 0 or 1 with the use of a bit in the continuation of the program: The backward value of a bit is the lowest value (in terms of the concrete lattice) that is sufficient to produce the output required of the computation (according to the standard meaning of the computation). The backward and the forward value of a bit can never be incomparable (as would happen if, say, the forward value were 0 whereas the backward value were 1); for this condition would mean that the continuation of a computation required that the bit have a different value from that assigned to it by the prefix of the computation (according to the standard meanings of the prefix and the continuation). Such nonsensical meanings are ruled out as plainly unrealizable: the continuation of a computation must be given a meaning that is consistent with that given to the prefix in order for us to reason about (and realize) the computation. Consequently the backward value of a bit will always be comparable to (⊑) the forward value for the same bit.

Concrete Semantics

Forward Semantics of Primitive Boolean Functions

The semantics of the bitwise operators (AND, OR, and NOT) are formulated on individual bits. Since these operators are bitwise, the meaning of AND, OR, and NOT on entire words will follow immediately: the meaning of each bit in the result will be the result of applying the single-bit meaning to the corresponding bits of the inputs.

TABLE 1

| AND | ⊥ | 0 | 1 |
|---|---|---|---|
| ⊥ | ⊥ | 0 | ⊥ |
| 0 | 0 | 0 | 0 |
| 1 | ⊥ | 0 | 1 |

TABLE 2

| OR | ⊥ | 0 | 1 |
|---|---|---|---|
| ⊥ | ⊥ | ⊥ | 1 |
| 0 | ⊥ | 0 | 1 |
| 1 | 1 | 1 | 1 |

TABLE 3

| NOT | |
|---|---|
| $\bot$ | $\bot$ |
| 0 | 1 |
| 1 | 0 |

Tables 1, 2, and 3 above correspond exactly to the usual definitions of AND, OR, and NOT, in the case of 0 and 1 inputs. The AND and OR operators, however, produce non-$\bot$ results given $\bot$ as an input, under some circumstances. They are said to be non-strict in that they do not require fully defined inputs in order to produce a fully defined output. This is a matter of definition; that is, they may be defined as producing a $\bot$ result whenever presented with $\bot$ on either input. The definition above, however, corresponds more precisely to the way they are used in assembly language programming and programming language implementation. For example, a program fragment like this struct S {unsigned a:28; unsigned b:4} x;
    x.a=0x1234567;
    x.b=0x8;

might be implemented in assembly language by something equivalent to the following:

unsigned x;
    x=(x & 0xFFFFFFF0)|=(0x1234567<<4);
    x=(x & 0x0000000F)|=0x8;

The first assignment to x defines the upper 28 bits (field a) and the second assignment defines the lower 4 bits. The intermediate language generated for a bitfield assignment will ordinarily not take into account (and cannot take into account in general) whether the word into which the bitfield is being inserted has been previously initialized to a well-defined value. Thus bitwise operators are employed in their capacity to operate on undefined values. The same holds true for shift operators, which play a similar role in intermediate language (we will consider shift operators shortly).

The correctness of these definitions comes from the fact that these operators as generally realized in digital circuits do in fact behave as documented in the above tables. The reason is simply that undefined values in ordinary digital circuits are either 0 or 1. The AND or OR circuit never sees, in reality, a physical signal corresponding to $\bot$, it sees only 0 or 1; when $\bot$ is written it means that it is not known which of these it is, that the program has not defined the bit to be one or the other. If uninitialized values in a computer circuit could correspond to something other than 0 or 1, it might well invalidate our assumptions concerning the behavior of AND, OR, and NOT on undefined values.

The functions defined by the above tables are noted by AND(a,b), OR(a,b), and NOT(a). For example, AND(0,$\bot$)= 0, because the AND table gives 0 as the result of AND given inputs 0 and $\bot$.

Consider Table 1 for AND above. The sub-table defined by columns and rows labeled 0 or 1 is identical to the familiar 2×2 boolean truth table for AND. The table has been extended to account for the possibility that one or both inputs may be $\bot$. The particular extension chosen is monotonic, which is a kind of continuity in a function that says that as an input is raised from an undefined ($\bot$) value to a fully-defined value (0 or 1), the output of the function either rises or stays the same; in particular the output does not fall or move laterally from 0 to 1 or vice versa. The condition for the monotonicity of AND for example is that:

$$x \sqsubseteq y \Rightarrow \text{AND}(x, z) \sqsubseteq \text{AND}(y, z) \forall x,y,z$$

It is easily verified that the tables written for AND, OR, and NOT are the maximal monotonic functions that are consistent with the basic 2-valued boolean functions AND, OR, and NOT, in that if any $\bot$ in the output of the function were replaced by 0 or 1, the monotonicity of the function would be lost.

The semantics of complex boolean functions follows immediately from the AND, OR, and NOT tables above, provided that we can express the complex function in terms of AND, OR, and NOT operations. For example the XOR operator:

$$x \oplus y = \text{OR}(\text{AND}(x, \text{NOT}(y)), \text{AND}(y, \text{NOT}(x)))$$

is shown in Table 4, which is derived by simple application of the tables for AND, OR, and NOT to the XOR equation:

TABLE 4

| XOR | $\bot$ | 0 | 1 |
|---|---|---|---|
| $\bot$ | $\bot$ | $\bot$ | $\bot$ |
| 0 | $\bot$ | 0 | 1 |
| 1 | $\bot$ | 1 | 0 |

Backward Semantics of Primitive Boolean Functions

Consider the assignment x=y & z;

Suppose it is known that x is used in the continuation of this computation and that its value is 0. This demand on x translate into demands on y and z in that y and z must be sufficiently well-defined to cause x to be 0, but they need be no better defined. So y and z are defined so that they cause x to become 0, and nothing further (at least from the point of view of this single program fragment and what is known of the demands placed on x by the continuation). This idea may be captured in tables that are, in effect, the inverses of those given above for AND, OR, and NOT:

TABLE 5

| AND$^{-1}$ (input$_{f1}$ input$_{f2}$ output$_b$) | input$_{b1}$ input$_{b2}$ |
|---|---|
| XX$\bot$ | $\bot\bot$ |
| 0X0 | 0$\bot$ |
| X00 | $\bot$0 |
| 111 | 11 |

TABLE 6

| OR$^{-1}$ (input$_{f1}$ input$_{f2}$ output$_b$) | input$_{b1}$ input$_{b2}$ |
|---|---|
| XX$\bot$ | $\bot\bot$ |
| 1X1 | 1$\bot$ |
| X11 | $\bot$1 |
| 000 | 00 |

TABLE 7

| NOT$^{-1}$ (output$_b$) | input$_b$ |
|---|---|
| $\bot$ | $\bot$ |
| 0 | 1 |
| 1 | 0 |

Consider Table 5 for AND$^{-1}$. It maps a pair of forward values for the inputs along with a backward value for the output, to a pair of backward values for the inputs. In other words, they map a demand on the output to a demand on the inputs, given the forward value of the inputs. The Xs in the table represent don't care values; i.e., any of $\bot$, 0, or 1 can be substituted for the X. Since we require that the backward semantics be consistent with the forward semantics, the forward values are used for the inputs to the operator to obtain backward values for the input that are comparable to them.

Table 5 for $AND^{-1}$ is ambiguous concerning the input 000; this case matches both 0X0 and X00. Either result (0$\bot$ or $\bot$0) is correct; that is, the continuation will obtain the 0 it demands provided that either of the inputs to the AND are 0. Because of this ambiguity, there are in general multiple backward meanings for a program that are consistent with its forward meaning.

Interestingly, this is also a point where the function is non-monotonic. That is, either 000→$\bot$0 or 000→0$\bot$ is chosen, and in either case the choice will cause the function to be non-monotonic. If we choose 000→$\bot$0 is chosen, then since 0$\bot$0→0$\bot$, the situation occurs that a rise in the second argument from $\bot$ to 0 causes a fall in the first output bit from 0 to $\bot$; and similarly if we choose 000→0$\bot$ is chosen.

Note that $NOT^{-1}$ is defined independently of forward values: the requirements on its input are uniquely determined by its output, and they are necessarily consistent with the forward values for the inputs.

The syntax $AND_1^{-1}(x,y,z)$ represents the first bit returned by $AND^{-1}$ (i.e., the backward value of the first input), and $AND_2^{-1}$ to represent the second bit returned by $AND^{-1}$ (i.e., the backward value of the second input). These bits are indicated in Tables 5,6, and 7 as $input_{b1}$ and $input_{b2}$ in the $AND^{-1}$ table. A similar notation for $OR_1^{-1}$ and $OR_2^{-1}$ is used.

Backward Semantics of Complex Boolean Functions

It may be desired to compute the backward semantics of an operator that is a complex expression over AND, OR, NOT, and one-bit variables. For example, consider the XOR operator:

$$x \oplus y = OR(AND(x, NOT(y)), AND(y, NOT(x)))$$

Here two one-bit variables, x and y, and an expression over x and y in terms of OR, AND, and NOT exist. Given a backward value for the OR(AND(x, NOT(y)), AND(y, NOT(x))) term as a whole, and forward values for the term and all of its subterms, the inverse operators $OR^{-1}$, $AND^{-1}$, and $NOT^{-1}$ may be applied top-down in order to derive backward values for x and y as well as all the other subterms. If it is assumed that the backward value for the term as a whole is 1, and that x and y have forward values of 0 and 1 respectively. Then the procedure for computing the backward value of each of the subterms is illustrated in the following Table 8:

The forward values are obtained from the forward semantics for AND, OR, and NOT, given forward values for x and y of 0 and 1 respectively. The initial backward value (1) for the term as a whole is given, and backward values for each of the subterms are derived. Working top-down: first apply $OR^{-1}$ to the forward values of the subexpressions of the OR and the backward value of the term as a whole. The first subterm of the OR—AND(x,NOT(y))— has a forward value of 0, and the second subterm of the OR—AND(y,NOT (x))— a forward value of 1. Given these three inputs (011), $OR^{-1}$ is applied to obtain $\bot$1 as the backward values of the first and second input respectively. The process continues by descending into the first and second subterms of the OR with the appropriate backward value in hand. The result is that x is encountered twice during the traversal, once within a NOT expression, and once as an argument to AND. Those two occurrences of x are determined by the semantics described as having different backward values. In the rows labeled x in Table 8, one of these rows, the backward value is given as $\bot$, while in the other it is 0. Since x represents one and the same bit of input in both cases, the backward value of the variable x must be computed by joining ($\sqcup$) the backward values for each occurrence of x in the term. In this case the backward value for x in the term as a whole is 0.

Procedure Invert-expression

To summarize the above procedure for computing the backward semantics of a boolean function of 1-bit variables: the function is expressed in terms of AND, OR, and NOT, and then, given a backward value for the term as a whole and forward value for each of its inputs, the operators $AND^{-1}$, $OR^{-1}$, and $NOT^{-1}$ are applied to the expression top-down in order to obtain backward values for each of its subterms. The backward value for each occurrence of a variable in the term is joined in order to obtain the backward value for the variable in the term as a whole. This is referred to as procedure invert-expression in the text that follows.

This procedure may be used to create an inverse in tabular form for a complex operation, like XOR, one row at a time. In this case the results obtained from this procedure are shown in Table 9:

TABLE 9

| $XOR^{-1}$ ($input_{f1}$ $input_{f2}$ $output_b$) | $input_{b1}$ $input_{b2}$ |
|---|---|
| XX$\bot$ | $\bot\bot$ |
| 000 | 00 |
| ▓▓▓ | ▓▓ |
| 101 | 10 |
| 110 | 11 |

The highlighted row is the one computed above.

Forward Semantics of Operations on Words

The semantics presented heretofore are for operations on a single bit. Consider the extension of these semantics to

TABLE 8

| x⊕y | forward value argument 1 | forward value argument 2 | backward value | backward value argument 1 | backward value argument 2 |
|---|---|---|---|---|---|
| OR(AND(x,NOT(y)),AND(y,NOT(x))) | 0 | 1 | 1 | $\bot$ | 1 |
| AND(x,NOT(y)) | 0 | 0 | $\bot$ | $\bot$ | $\bot$ |
| x | | | $\bot$ | | |
| NOT(y) | 1 | | $\bot$ | $\bot$ | |
| y | | | $\bot$ | | |
| AND(y,NOT(x)) | 1 | 1 | 1 | 1 | 1 |
| y | | | 1 | | |
| NOT(x) | 0 | | 1 | 0 | |
| x | | | 0 | | | operations on words. A word may be denoted in one of two ways. The individual bit values may be written next to one another, as in 01⊥0 (a 4-bit word). When richer expressions are needed for some of the bits, the bits of the word will be put between angle brackets <>, and separate them by commas, as in <AND(0,1), OR(1,0)> (a 2-bit word).

All operations on words can be seen as a collection of operations on individual bits, one such operation for each bit in the result word. Taking this view, each of the input words is merely a sequence of bits, and by naming each of the bits within the input words, the case of an operation on words is reduced to operations on individual bits that have already been considered.

Bitwise Boolean Operators

In the case of the bitwise operators—AND, OR, NOT—the semantics of an operation on words is simply the single-bit semantics applied bitwise to the inputs. For example, AND(<a,b>,<c,d>)=<AND(a,b), AND(c,d)> gives the formula for AND applied to 2-bit words. The general forms are simply:

AND(<$a_n,a_{n-1},\ldots a_1$>,<$b_n,b_{n-1},\ldots,b_1$>)=<AND($a_n,b_n$), AND($a_{n-1},b_{n-1}$), $\ldots$, AND($a_1,b_1$)>

OR(<$a_n,a_{n-1},\ldots a_1$>,<$b_n,b_{n-1},\ldots,b_1$>)=<OR($a_n,b_n$), OR($a_{n-1},b_{n-1}$), $\ldots$, OR($a_1,b_1$)>

NOT(<$a_n,a_{n-1},\ldots a_1$>)=<NOT($a_n$), NOT($a_{n-1}$), $\ldots$, NOT($a_1$)>

Shift Operators

Shift operators simply move bits around within a word, introducing either 0s or copies of the MSB, depending on the kind of shift. All shift operators may be characterized by writing the semantics of a shift by a single bit position:

LEFT(<$a_n,a_{n-1},\ldots,a_1$>)=<$a_{n-1},a_{n-2},\ldots,0$>

URIGHT(<$a_n,a_{n-1},\ldots,a_1$>)=<$0,a_n,a_{n-1},\ldots,a_2$>

SRIGHT(<$a_n,a_{n-1},\ldots,a_1$>)=<$a_n,a_n,a_{n-1},\ldots,a_2$>

Here, URIGHT represents a logical (unsigned) right shift, and SRIGHT a signed (arithmetic) right shift, by one bit.

Other Operators

The forward semantics of any binary operation on words can be expressed as a word of operations on individual bits. For example, addition on 2-bit integers can be expressed as ADD(<a,b>, <c,d>)=<$a \oplus c \oplus$AND(b,d), $b \oplus d$> where $x \oplus y$=OR(AND(x, NOT(y)), AND(y, NOT(x)))

Hence in this case we simply have two operations on the bits a, b, c, and d, one operation to produce the LSB of the sum, another to produce the MSB. Note that the bitwise and shift operators on words are simply special cases of an operation on words that can be expressed in terms of AND, OR, NOT over 1-bit variables.

Backward Semantics of Operations on Words

Exactly the same reasoning applies in the backward direction; that is, by viewing an operation on words as a sequence of operations on bits, the technique may be applied for computing backward semantics to operations on words.

Bitwise Boolean Operators

We can easily extend the inverses $AND^{-1}$, $OR^{-1}$, and $NOT^{-1}$ to operations on words:

$AND^{-1}$(<$a_n,a_{n-1},\ldots a_1$>,<$b_n,b_{n-1},\ldots,b_1$>,<$c_n,c_{n-1},\ldots,c_1$>)=(<$AND_1^{-1}(a_n,b_n,c_n)$, $AND_1^{-1}(a_{n-1},b_{n-1},c_{n-1})$, $\ldots$, $AND_1^{-1}(a_1,b_1,c_1)$>, <$AND_2^{-1}(a_n,b_n,c_n)$, $AND_2^{-1}(a_{n-1},b_{n-1},c_{n-1})$, $\ldots$, $AND_2^{-1}(a_a,b_1,c_1)$>)

$OR^{-1}$(<$a_n,a_{n-1},\ldots a_1$>,<$b_n,b_{n-1},\ldots,b_1$>,<$c_n,c_{n-1},\ldots,c_1$>)=(<$OR_1^{-1}(a_n,b_n,c_n)$, $OR_1^{-1}(a_{n-1},b_{n-1},c_{n-1})$, $\ldots$, $OR_1^{-1}(a_1,b_1,c_1)$>, <$OR_2^{-1}(a_n,b_n,c_n)$, $OR_2^{-1}(a_{n-1},b_{n-1},c_{n-1})$, $\ldots$, $OR_2^{-1}(a_1,b_1,c_1)$>)

$NOT^{-1}$(<$a_n,a_{n-1},\ldots a_1$>)=<$NOT^{-1}(a_n)$, $NOT^{-1}(a_{n-1})$, $\ldots$, $NOT^{-1}(a_1)$>

As in the case of the single-bit versions, here the arguments to $AND^{-1}$ and $OR^{-1}$ are the forward values of the inputs and the backward value of the output. The result is two words, one representing the backward value of the first input, the other representing the backward value of the second input. In the case of $NOT^{-1}$, the result is simply a word representing the backward value of the input.

Shift Operators

The backward semantics of shift operators simply transmit the demands on their outputs through to their inputs. For example, it may be written that:

$LEFT^{-1}$(<$a_n,a_{n-1},\ldots,a_1$>)=<$\perp,a_n,a_{n-1},\ldots,a_2$>

$URIGHT^{-1}$(<$a_n,a_{n-1},\ldots,a_1$>)=<$a_{n-1},a_{n-2},\ldots,a_1,\perp$>

$SRIGHT^{-1}$(<$a_n,a_{n-1},\ldots,a_1$>)=<$a_n \sqcup a_{n-1},a_{n-2},\ldots,a_1,\perp$>

Note that the semantics of $SRIGHT^{-1}$ reflect the fact that the sign bit is copied by the SRIGHT operator. This is an example of joining the backward values of all occurrences of a variable (the sign bit of the input, in this case) in order to produce the backward value of the variable in an expression in which it occurs more than once Other Operators Procedure invert-expression given above inverts a complex operation on single bits. This procedure may be applied directly to operations on words, when they are expressed in terms of AND, OR, and NOT (or in terms of other operators whose inverses were derived above, as was done in the case of XOR above). The inverse of an n-ary operation on words is n words of bitwise inverses, one such word for each of the arguments to the operator. Consider the equation for a 2-bit ADD:

ADD(<a,b>, <c,d>)=<XOR(a,XOR(c,AND(b,d))), XOR(b,d)>

Procedure invert-expression shows how to construct the inverse of an expression on single bits. Each bit in the word produced by ADD is such an expression. These single-bit inverses are functions from three bits (two forward value inputs and one backward value output) to two bits (two backward value inputs). Let us call these inverses F and G here, so that:

$ADD^{-1}$(<a,b>, <c,d>, <e,f>)=(<$F_1(a_f,b_f,e_b)$, $G_1(c_f,d_f,f_b)$>, <$F_2(a_f,b_f,e_b)$, $G_2(c_f,d_f,f_b)$>)

The notation $a_f$ may be used to refer to the forward value of the variable a, and the notation $e_b$ to refer to the backward value of variable e. As before, the notation $F_1$ and $F_2$ may be used to indicate the function F restricted to one bit of output (first and second bit respectively). The inverse $ADD^{-1}$ produces two words, one representing the backward value of the word <a,b>, the other representing the backward value of the word <c,d>.

Abstract Domain

The abstraction, or systematic approximation, of the above concrete semantics may be considered in order to obtain a semantics that is appropriate for static program analysis.

The concrete domain exhibited above gives a meaning to one bit within one value that is produced by a computation and consumed by the continuation of that computation. By abstraction of this domain obtains a domain that speaks of the meaning of a bit over several different computations or at different points in a single computation. It is this kind of reasoning—about sets of computations rather than single computations—that is required for static analysis.

Consider the abstract domain of FIG. 3. The elements of the abstract domain are $0_A$, $1_A$, $\perp_A$, $T_A$. Each abstract domain element represents a downward closed subset of the concrete domain. Such an abstract domain is known as a Hoare power domain. If a bit is described by an element of this abstract domain, then its value is one of the concrete domain elements contained in the abstract element. For example, if a bit is described by the abstract value $1_A$, it is known that its value in the concrete domain is either $\perp$ or 1. It may be that the bit is undefined on one program execution path and defined to be 1 on a different program path, and that the abstract value $1_A$ has been used to summarize the set of possibilities for the bit over both execution paths. In the backward sense, the abstract value of $1_A$ means that the value is either unused in the continuation or else is used as the value 1. Note that this domain allows us to say when a value is definitely undefined or unused (this situation is represented by $\perp_A$) but not to say when a value is definitely defined or definitely used: the abstract value $0_A$, for example, includes both the concrete $\perp$ and 0 as possibilities.

Abstract Semantics

Abstract Forward Semantics of Primitive Boolean Functions

TABLE 10

| AND | $\perp_A$ | $0_A$ | $1_A$ | $T_A$ |
|---|---|---|---|---|
| $\perp_A$ | $\perp_A$ | $0_A$ | $\perp_A$ | $0_A$ |
| $0_A$ | $0_A$ | $0_A$ | $0_A$ | $0_A$ |
| $1_A$ | $\perp_A$ | $0_A$ | $1_A$ | $T_A$ |
| $T_A$ | $0_A$ | $0_A$ | $T_A$ | $T_A$ |

TABLE 11

| OR | $\perp_A$ | $0_A$ | $1_A$ | $T_A$ |
|---|---|---|---|---|
| $\perp_A$ | $\perp_A$ | $\perp_A$ | $1_A$ | $1_A$ |
| $0_A$ | $\perp_A$ | $0_A$ | $1_A$ | $T_A$ |
| $1_A$ | $1_A$ | $1_A$ | $1_A$ | $1_A$ |
| $T_A$ | $1_A$ | $T_A$ | $1_A$ | $T_A$ |

TABLE 12

| NOT | |
|---|---|
| $\perp_A$ | $\perp_A$ |
| $0_A$ | $1_A$ |
| $1_A$ | $0_A$ |
| $T_A$ | $T_A$ |

Tables 10, 11 and 12 illustrate the AND, or, and NOT functions over the abstract domain of FIG. 3. When it is not clear from the context whether reference is made to AND in the concrete domain or AND in the abstract domain, $AND_{abstract}$ or $AND_{concrete}$ will be written.

Some of the entries in the table above may be surprising at first glance; $AND(\perp_A, T_A) = 0_A$, for example. Each entry has been derived by joining the concrete cases it represents. The formula for AND in the abstract domain is for example:

$$AND_{abstract}(x, y) = \sqcup\{Abs(AND_{concrete}(a, b)) | a \in x, b \in y\}$$

The function Abs is simply the obvious injection of the concrete domain into the abstract domain: $\perp \to \perp_A$, $0 \to 0_A$, $1 \to 1_A$. In other words, each concrete domain element is mapped to the least abstract domain element that contains it.

In the case of $AND(\perp_A, T_A)$, the above equation resolves to $$AND(\perp, \perp) \sqcup AND(\perp, 0) \sqcup AND(\perp, 1) = \perp_A \sqcup 0_A \sqcup \perp_A = 0_A$$

The Abs notation has been omitted since it is known by one of ordinary skill in the art.

Abstract Backward Semantics of Primitive Boolean Functions

The inverses of AND, OR, and NOT may be derived over the abstract domains from their concrete counterparts in exactly the same way as AND, OR, and NOT over the abstract domain, namely by joining all the concrete cases represented by each abstract case. Tables 13, 14, and 15 result are as follows:

TABLE 13

| $AND^{-1}$ (input$_{f1}$ input$_{f2}$ output$_b$) | input$_{b1}$ input$_{b2}$ |
|---|---|
| XX$\perp_A$ | $\perp_A \perp_A$ |
| $0_A \perp_A 0_A$ | $0_A \perp_A$ |
| $0_A 1_A 0_A$ | $0_A \perp_A$ |
| $\perp_A 0_A 0_A$ | $\perp_A 0_A$ |
| $1_A 0_A 0_A$ | $\perp_A 0_A$ |
| $0_A 0_A 0_A$ | $0_A 0_A$ |
| $0_A T_A 0_A$ | $0_A 0_A$ |
| $T_A 0_A 0_A$ | $0_A 0_A$ |
| $1_A 1_A 1_A$ | $1_A 1_A$ |
| $1_A T_A 1_A$ | $1_A 1_A$ |
| $T_A 1_A 1_A$ | $1_A 1_A$ |
| $T_A T_A 1_A$ | $1_A 1_A$ |
| $1_A T_A T_A$ | $1_A T_A$ |
| $T_A 1_A T_A$ | $T_A 1_A$ |
| $T_A T_A T_A$ | $T_A T_A$ |

TABLE 14

| $OR^{-1}$ (input$_{f1}$ input$_{f2}$ output$_b$) | input$_{b1}$ input$_{b2}$ |
|---|---|
| XX$\perp_A$ | $\perp_A \perp_A$ |
| $1_A \perp_A 1_A$ | $1_A \perp_A$ |
| $1_A 0_A 1_A$ | $1_A \perp_A$ |
| $\perp_A 1_A 1_A$ | $\perp_A 1_A$ |
| $0_A 1_A 1_A$ | $\perp_A 1_A$ |
| $1_A 1_A 1_A$ | $1_A 1_A$ |
| $1_A T_A 1_A$ | $1_A 1_A$ |
| $T_A 1_A 1_A$ | $1_A 1_A$ |
| $0_A 0_A 0_A$ | $0_A 0_A$ |
| $0_A T_A 0_A$ | $0_A 0_A$ |
| $T_A 0_A 0_A$ | $0_A 0_A$ |
| $T_A T_A 0_A$ | $0_A 0_A$ |
| $0_A T_A T_A$ | $0_A T_A$ |
| $T_A 0_A T_A$ | $T_A 0_A$ |
| $T_A T_A T_A$ | $T_A T_A$ |

TABLE 15

| $NOT^{-1}$ (output$_b$) | input$_b$ |
|---|---|
| $\perp_A$ | $\perp_A$ |
| $0_A$ | $1_A$ |
| $1_A$ | $0_A$ |
| $T_A$ | $T_A$ |

Given that backward values are consistent with (not higher than) the corresponding forward values, so these tables omit those cases in which output$_b$ is higher than the output$_f$ that would be produced by AND, OR, or NOT from the values of input$_{f1}$ and input$_{f2}$.

These tables are weaker than their concrete counterparts in two important cases: $AND^{-1}(000)$, and $OR^{-1}(111)$. In the concrete case, when an AND produces a zero, one of the inputs to the AND can be given a backward value of $\perp$; the remaining input can provide the 0 that is necessary to cause an output of 0. In the abstract case, however, a $0_A$ represents both a fully-defined 0 and $\perp$. The case of $AND^{-1}(0_A 0_A 0_A)$ therefore includes both the concrete cases of $AND^{-1}(0 \perp 0)$ and $\text{AND}^{-1}(\perp 00)$. Therefore, it is not known which of the inputs may be given a backwards value of $\perp_A$. The case of $\text{OR}^{-1}(1_A 1_A 1_A)$ is analogous. Recall that these two cases were those, which caused $\text{AND}^{-1}$ and $\text{OR}^{-1}$ over the concrete domain to be non-monotonic. Their abstract counterparts are monotonic, which has the advantage that it guarantees the convergence of the program analysis that is based on them.

To be able to assert a backward value of $\perp$ provides important information that it is worth additional effort. The case of an AND operation in which one of the operands is an immediate constant (an expression like x & 0xFFFF0000 in a C program), shows that the immediate constant provides a concrete value of 0 or 1 and not an abstract value of $0_A$ or $1_A$. Tables 16 and Table 17 result when these AND-with-immediate and OR-with-immediate operations are inverted:

TABLE 16

| $\text{AND}_k^{-1}$ | 0 (immediate) | 1 (immediate) |
|---|---|---|
| $\perp_A$ | $\perp_A$ | $\perp_A$ |
| $0_A$ | $\perp_A$ | $0_A$ |
| $1_A$ | $\perp_A$ | $1_A$ |
| $T_A$ | $\perp_A$ | $T_A$ |

TABLE 17

| $\text{OR}_k^{-1}$ | 0 (immediate) | 1 (immediate) |
|---|---|---|
| $\perp_A$ | $\perp_A$ | $\perp_A$ |
| $0_A$ | $0_A$ | $\perp_A$ |
| $1_A$ | $1_A$ | $\perp_A$ |
| $T_A$ | $T_A$ | $\perp_A$ |

The horizontal axis corresponds to the immediate (constant) input to the AND or OR, and the vertical axis corresponds to the result (output) from the AND or OR. The values within the table are the backward value of the varying input to the AND or OR. As can be seen, $\text{AND}_k^{-1}$ in this case produces a backwards value of $\perp$ whenever its immediate input is 0, and $\text{OR}_k^{-1}$ produces a backwards value of $\perp$ when its immediate input is 1. By considering the immediate 0 and 1 as concrete values, and working through the concrete values represented by each of the abstract output values, the table will be seen to follow directly from the concrete inverses for $\text{AND}^{-1}$ and $\text{OR}^{-1}$. Note that $\text{AND}_k^{-1}$ and $\text{OR}_k^{-1}$ are monotonic (for the reason that $\perp$ is not a possibility for the immediate input).

Abstract Forward Semantics of Complex Boolean Functions

The observations we made concerning forward semantics of complex functions of 1-bit variables in the concrete domain hold, mutatis mutandis, in the abstract domain. Namely, the forward abstract semantics of such a function follows from the abstract semantics of AND, OR, and NOT applied to the expression of the function in terms of these primitive boolean operations. For example, the abstract semantics of the XOR operator $$x \oplus y = \text{OR}(\text{AND}(x, \text{NOT}(y)), \text{AND}(y, \text{NOT}(x)))$$

results with Table 18, which can be derived by application of the tables for AND, OR, and NOT in the abstract domain to the XOR equation:

TABLE 18

| XOR | $\perp_A$ | $0_A$ | $1_A$ | $T_A$ |
|---|---|---|---|---|
| $\perp_A$ | $\perp_A$ | $\perp_A$ | $\perp_A$ | $\perp_A$ |
| $0_A$ | $\perp_A$ | $0_A$ | $1_A$ | $T_A$ |
| $1_A$ | $\perp_A$ | $1_A$ | $0_A$ | $T_A$ |
| $T_A$ | $\perp_A$ | $T_A$ | $T_A$ | $T_A$ |

There is however a second route possible in computing the abstract semantics of a complex function: one may first compute its concrete semantics, and inject the result into the abstract domain. In the case of XOR we would write $$\text{XOR}_{abstract}(x,y) = LI\{\text{XOR}_{concrete}(a,b) | a \in x, b \in y\}$$

where $\text{XOR}_{concrete}$ is the concrete forward semantics for XOR. It can be shown that the same result is obtained regardless of the route taken; this is due to the fact that our abstract domain is a distributive lattice, and that AND, OR, and NOT are monotonic functions over this lattice (and hence, functions that are compositions of AND, OR, and NOT are likewise monotonic).

Abstract Backward Semantics of Complex Boolean Functions

The abstract backward semantics of complex one bit operations can likewise be obtained by the procedure outlined for the computation of backward values for complex operations in the concrete domain (see the derivation of the table for $\text{XOR}^{-1}$ above). The operation is expressed under consideration in terms of AND, OR, and NOT, and then, given a backward value for the term as a whole and forward values for each of its inputs. The abstract operators $\text{AND}^{-1}$, $\text{OR}^{-1}$, and $\text{NOT}^{-1}$ are applied to the expression top-down in order to obtain backward values for each of the subterms. The backward value for each occurrence of a variable in the term is joined together in order to obtain the backward value for the variable in the term as a whole.

As in the case of the forward semantics of such operations, there is a second route possible for deriving the abstract backward semantics, namely, by computing the concrete backward semantics, and injecting this concrete semantic into the abstract domain. In the case of the forward abstract semantics, these routes result in the same abstract semantics; but in the backward case this is not so, because of the non-monotonicity of $\text{AND}^{-1}$ and $\text{OR}^{-1}$. Consider this expression:

$$\text{OR}(\text{AND}(a, \text{AND}(b, \text{NOT}(b))), b)$$

If a concrete $\text{AND}^{-1}$ is used that maps 000 to $\perp 0$, then the concrete backward semantics for this expression will assign a backward value of $\perp$ to a (for all backward values for the expression as a whole and for all forward values for a and b). The abstraction of this concrete backward semantic will likewise assign a backward value of $\perp_A$ to a. If the backward semantics are constructed for this expression by working in the abstract domain (beginning with an abstract value for the expression as a whole and abstract forward values for a and b, and applying $\text{AND}^{-1}$, $\text{OR}^{-1}$, and $\text{NOT}^{-1}$ in the abstract domain to derive abstract backward values for each subterm), a is given a backward abstract value of $0_A$. The reason, as indicated earlier, is that $\text{AND}^{-1}$ in the abstract domain is weaker than its concrete counterpart, at exactly the point where the concrete $\text{AND}^{-1}$ is non-monotonic. Note that either route gives a correct result, and the top-down compositional procedure is the basis for a practical method when backward values need be computed from a single-tuple of forward values and a backward value for the term as a whole. But to compute the inverse in the concrete domain and afterwards inject the result into the abstract domain will in general give a more accurate result. In this particular example, if the term AND(b, NOT(b)) is simplified to an immediate 0, then we could apply $AND_k^{-1}$ and not $AND^{-1}$, and the result would be that the two routes to a backward semantics would yield identical results.

Abstract Semantics of Operations on Words

The extension of the abstract semantics from a single bit to a word mirrors the concrete case exactly. In particular, the following formulas are identical in the concrete and abstract cases:

$AND(<a_n,a_{n-1}, \ldots a_1>,<b_n,b_{n-1}, \ldots ,b_1>)=<AD(a_n,b_n),$
$AND(a_{n-1},b_{n-1}), \ldots ,AND(a_1,b_1)>$ $OR(<a_n,a_{n-1}, \ldots a_1>,<b_n,b_{n-1}, \ldots ,b_1>)=<OR(a_n,b_n),OR$
$(a_{n-1},b_{n-1}), \ldots ,OR(a_1,b_1)>$ $NOT(<a_n,a_{n-1}, \ldots a_1>)=<NOT(a_n),NOT(a_{n-1}), \ldots ,NOT(a_1)>$ $LEFT(<a_n,a_{n-1}, \ldots ,a_1>)=<a_{n-1},a_{n-2}, \ldots , 0_A>$ $URIGHT(<a_n,a_{n-1}, \ldots ,a_1>)=<0_A,a_n,a_{n-1}, \ldots ,a_2>$ $SRIGHT(<a_n,a_{n-1}, \ldots ,a_1>)=<a_n,a_a,a_{n-1}, \ldots ,a_2>$ Likewise for the backward abstract semantics:

$AND^{-1}(<a_n,a_{n-1}, \ldots a_1>,<b_n,b_{n-1}, \ldots ,b_1>,<c_n, c_{n-1}, \ldots , c_1>)=(<AND_1^{-1}(a_n,b_n,c_n),AND_1^{-1}(a_{n-1},b_{n-1}, c_{n-1}), \ldots , AND_1^{-1}(a_1,b_1,c_1)>,$
$<AND_2^{-1}(a_n,b_n,c_n),AND_2^{-1}(a_{n-1},b_{n-1},c_{n-1}), \ldots ,AND_2^{-1}(a_1,b_1,c_1)>)$ $OR^{-1}(<a_n,a_{n-1}, \ldots a_1>,<b_n,b_{n-1}, \ldots ,b_1>,<c_n, c_{n-1}, \ldots , c_1>)=(<OR_1^{-1}(a_n,b_n,c_n),OR_1^{-1}(a_{n-1},b_{n-1}, c_{n-1}), \ldots , OR_1^{-1}(a_1,b_1,c_1)>,$
$<OR_2^{-1}(a_n,b_n,c_n),OR_2^{-1}(a_{n-1},b_{n-1},c_{n-1}), \ldots ,OR_2^{-1}(a_1, b_1,c_1)>)$ $NOT^{-1}(<a_n,a_{n-1}, \ldots . a_1>)=<NOT^{-1}(a_n),NOT^{-1}(a_{n-1}), \ldots , NOT^{-1}(a_1)>$ $LEFT^{-1}(<a_n,a_{n-1}, \ldots ,a_1>)=<\perp_A,a_n,a_{n-1}, \ldots ,a_2>$ $URIGHT^{-1}(<a_n,a_{n-1}, \ldots ,a_1>)=<,a_{n-1},a_{n-2}, \ldots ,a_1, \perp_A>$ $SRIGHT^{-1}(<a_n,a_{n-1}, \ldots ,a_1>)=<a_n \sqcup a_{n-1},a_{n-2}, \ldots ,a_1, \perp_A>$ As mentioned, above the abstract backward semantics obtained by first computing the concrete backward semantics using procedure "invert-expression" and projecting the result into the abstract domain may be more accurate than the abstract backward semantics obtained by direct application of procedure invert-expression in the abstract domain; but the latter is sometimes a more practical technique, because it can be applied to a single-tuple of abstract values, for example, during program analysis, in cases where it might be impractical to compute the concrete backward semantics for an operation. This observation applies to operations on words as well as to operations on single bits.

Analysis Method

The abstract forward and backward semantics, such as $A_f$ 242 and $A_f$ 241 may be rendered directly as a program analysis method for the purpose of bit-level constant propagation. The input to the method is a program represented in an intermediate language. The syntax for the intermediate language used to illustrate the method is given below. The result of the method is a map from aliases to abstract values. Abstract values are a simple representation of words whose bits belong to the abstract domain, such as domain 300 of FIG. 3 defined above. The term alias is defined below.

Representing Abstract Values

An element of the abstract domain 300 may be represented using two bits, there being four elements in the domain. By choosing the meaning of the bits carefully, however, the common operations on words may be made efficient. By designating the two bits as Z and O, and considering the following encoding of Table 19:

TABLE 19

| Z | O | abstract value |
|---|---|---|
| 0 | 0 | $\perp_A$ |
| 0 | 1 | $0_A$ |
| 1 | 0 | $1_A$ |
| 1 | 1 | $T_A$ |

In this representation, bit Z represents the "zero-ness" of a bit, and O represents the "one-ness" of the bit. A bit that has neither zero-ness nor one-ness is $\perp_A$; a bit that has both is $T_A$.

Let AbstractValue be a structure with two integer members, called ZERO and ONE. For our purposes it is immaterial whether ZERO and ONE are signed or unsigned integers; because explicitly signed or unsigned operations will be used upon them where the distinction matters. An AbstractValue represents a single word W in the program being analyzed. The $l^{th}$ bit in W is represented by the $l^{th}$ bit of ZERO and the $l^{th}$ bit of ONE; these two corresponding bits from ZERO and ONE make up the <Z,O> pair that describes the $l^{th}$ bit of W. ZERO and ONE have the same number of bits as W.

As an example, suppose that W has 4 bits, and there is one execution path on which W has the (concrete) value $0\perp 01$ and another on which it has the value $0\perp 11$. Then the abstract value of W is (at least) $0_A \perp_A T_A 1_A$. This abstract value will be represented as an AbstractValue structure whose ZERO member is 1010 and whose ONE member is 0011. The two is within the ZERO member indicate that three of W s bits can be 0, and the two 1s within the ONE member indicate that two of W s bits can be 1. The ZERO and ONE members together form four <Z,O> pairs, each describing a single bit of W: <1,0>, <0,0>, <1,1>, and <0,1> respectively. Referring to the Z/O table above if may be seen that these pairs correspond to the abstract values $0_A$, $\perp_A$, $T_A$, and $1_A$ respectively.

If V is an AbstractValue then V.ZERO and V.ONE may be written to refer to the members of V. AbstractValue(A,B) may be written to indicate the construction of an AbstractValue whose ZERO member is A and whose ONE member is B. INT is used to denote the type of ZERO and ONE in the pseudocode below.

This choice of representation for words in the abstract domain means that the basic operations on abstract values may be efficiently implemented. The procedures for ⊔(JOIN), ·(MEET), ⊑(LE), AND, OR, NOT, LEFT, SRIGHT, and URIGHT on the AbstractValue type are as follows:

```
AbstractValue JOIN(AbstractValue V1, AbstractValue V2)
{
return   AbstractValue(V1.ZERO|V2.ZERO,
   O1.ONE|O2.ONE)
}
AbstractValue MEET(AbstractValue V1, AbstractValue V2)
{
   return AbstractValue(V1.ZERO & V2.ZERO, O1.ONE &
      O2.ONE)
}
```

```
bool LE(AbstractValue V1, AbstractValue V2)
{
  return (V1.ZERO|V2.ZERO)==V2.ZERO &&
    (V1.ONE|V2.ONE)==V2.ONE
}
AbstractValue And(AbstractValue V1, AbstractValue V2)
{
  return AbstractValue(V1.ZERO|V2.ZERO, O1.ONE &
    O2.ONE)
}
AbstractValue Or(AbstractValue V1, AbstractValue V2)
{
  return AbstractValue(V1.ZERO & V2.ZERO,
    O1.ONE|O2.ONE)
}
AbstractValue Not(AbstractValue V1)
{
  return AbstractValue(V1.ONE, V1.ZERO)
}
AbstractValue Left(AbstractValue V1)
{
  return AbstractValue(~(~V1.ZERO<<1), V1.ONE<<1)
}
AbstractValue SRight(Abstractvalue V1)
{
  return AbstractValue(~(~V1.ZERO>>>1), V1.ONE>>>1)
}
AbstractValue URight(Abstractvalue V1)
{
  return AbstractValue(~(~V1.ZERO>>1), V1.ONE>>1)
}
```

The syntax >>> is written to indicate an arithmetic right shift (shift with sign-extension), and >> to indicate a logical right shift (shift with zero-extension). It is easy to verify that these functions implement exactly the abstract semantics of AND, OR, NOT, LEFT, SRIGHT, and URIGHT presented earlier.

If the program analyzed uses more than one word size, more than one AbstractValue type may be needed, one for each word size, or else a single AbstractValue type with bits enough for the largest word size being analyzed, along with additional logic in the operations on AbstractValues to send the excess bits to ⊥ or to otherwise be ignored.

```
void And_inv(AbstractValue B, AbstractValue& V1,
    AbstractValue& V2)
{
    V1.ONE=V2.ONE=(V1.ONE & V2.ONE)
    V1.ZERO &=B.ZERO
    V1.ONE &=B.ONE
    V2.ZERO &=B.ZERO
    V2.ONE &=B.ONE
}
void Or_inv(AbstractValue B, AbstractValue& V1,
    AbstractValue& V2)
{
    V1.ZERO=V2.ZERO=(V1.ZERO & V2.ZERO)
    V1.ZERO &=B.ZERO
    V1.ONE &=B.ONE
    V2.ZERO &=B.ZERO
    V2.ONE &=B.ONE
}
void Not_inv(AbstractValue B, AbstractValue& V1)
{
    V1.ZERO &=B.ONE
    V1.ONE &=B.ZERO
}
void Left_inv(AbstractValue B, AbstractValue& V1)
{
    V1.ZERO &=B.ZERO>>1
    V1.ONE &=B.ONE>>1
}
void SRight_inv(AbstractValue B, AbstractValue& V1)
{
    V1.ZERO &=(B.ZERO<<1)|SignBitOnly(B.ZERO)
    V1.ONE &=(B.ONE<<1)|SignBitOnly(B.ONE)
}
void URight_inv(AbstractValue B, AbstractValue& V1)
{
    V1.ZERO &=B.ZERO<<1
    V1.ONE &=B.ONE<<1
}
INT SignBitOnly(INT X)
{
    int N=sizeof(X)*CHAR_BIT
    return X>>(N-1)<<(N-1)
}
```

An Example Intermediate Language

The intermediate language contains two operations for operating on the state of the computer: a GET expression for reading from memory or registers, and a PUT expression for writing to memory or registers. It is assumed that all operations on the state are performed using these operations; that is, none of the other operations in the language have implicit side-effects on the state, at least not on the state that is subject to analysis by this method. Every PUT and GET in the program is assumed to have associated with it an alias, such that if two GETs or PUTs have different aliases, then there is no execution of the program under which those GETs and PUTs access the same storage location (memory address or register). Aliases are therefore an equivalence relation on the GETs and PUTs of the program such that all potentially dependent GETs and PUTs are assigned the same alias. In the case of a compiler temporary variable, virtual register, or other storage location that is accessed simply and transparently by the program, the GETs and PUTs that access that temporary variable or virtual register will have the same alias, and no other PUTs and GETs in the program will have the same alias. Any alias analysis method that partitions the memory accesses of the program into equivalence classes according to potential dependence is adequate for the purpose of computing a correct set of aliases from the program; of course a sharper alias analysis method will yield a more precise result from the bitwise constant propagation method.

The representation of control flow in the intermediate language is irrelevant to the method, as the method is flow-insensitive.

For purposes of exposition, it is assumed that the statements of the intermediate language have the following syntax:

S: (PUT AE)
E: (INTEGER [T] Z)
  |(BITAND EE)
  |(BITOR EE)
  |(BITNOT E)
  |(LEFT E E)

|(SRIGHT E E)
|(URIGHT E E)
|(OP E E)
|(GET [T] A)
A: alias
Z: integer
T: integer (number of bits)

The expressions of this language are typed by their size in bits. A type is written as [T], where T is the number of bits. For example, [10] denotes a 10-bit type. The atomic forms—INTEGER and GET—include a type specifier, whereas the remaining, compound forms have an implicit type which can be deduced from the types of their subexpressions.

(PUT A E): This is the (abstract) form of a statement that writes to a storage location (memory or register). The expression E gives the value which is written to the location. A is an alias. The aliases must have the property that, given two GET or PUT expressions X1 and X2 whose aliases are different, there must be no execution of the program such that X1 and X2 access the same storage location.

In reality, an assignment to memory must include an expression for the address that is written, and an assignment to a register must include a specification of the register that is written; these are absent from our PUT expression, which has only an expression E for the value which is written to the memory location or register. This is because the information required by the method concerning the storage location affected by the PUT is summarized in the alias A associated with the PUT. A PUT expression yields no value; it is as though its type were [0].

(INTEGER [T] Z): This is the expression for an integer constant of T bits. Z is an integer that gives the value of the constant. For example, (integer [10] 17) is a 10-bit integer whose value is 17, or 0000010001 in binary.

(BITAND E E): This expression returns the bitwise AND of its two arguments. The types of the two arguments must be equal and the type of the result is that of the arguments.

(BITOR E E): This expression returns the bitwise OR of its arguments.

(BITNOT E): This expression returns the bitwise complement of its argument. The type of the result is the type of the argument.

(LEFT E): This expression returns the result of shifting its argument left by 1 bit. The vacated bit position is zero-filled.

(SRIGHT E): This expression returns the result of shifting its argument right by the 1 bit. The vacated bit position is filled with a copy of the most significant bit of the argument.

(URIGHT E E): This expression returns the result of shifting its argument right by the 1 bit. The vacated bit position is zero-filled.

(GET [T] A): This is the (abstract) form of an operation that reads from the state of the computer.

The method will first be described in terms of the foregoing primitive constructs, and afterwards discuss other operations and syntactic forms and how the method is applied to them.

A Method for Optimizing an Implementation of a Programming Language

Figure 5:
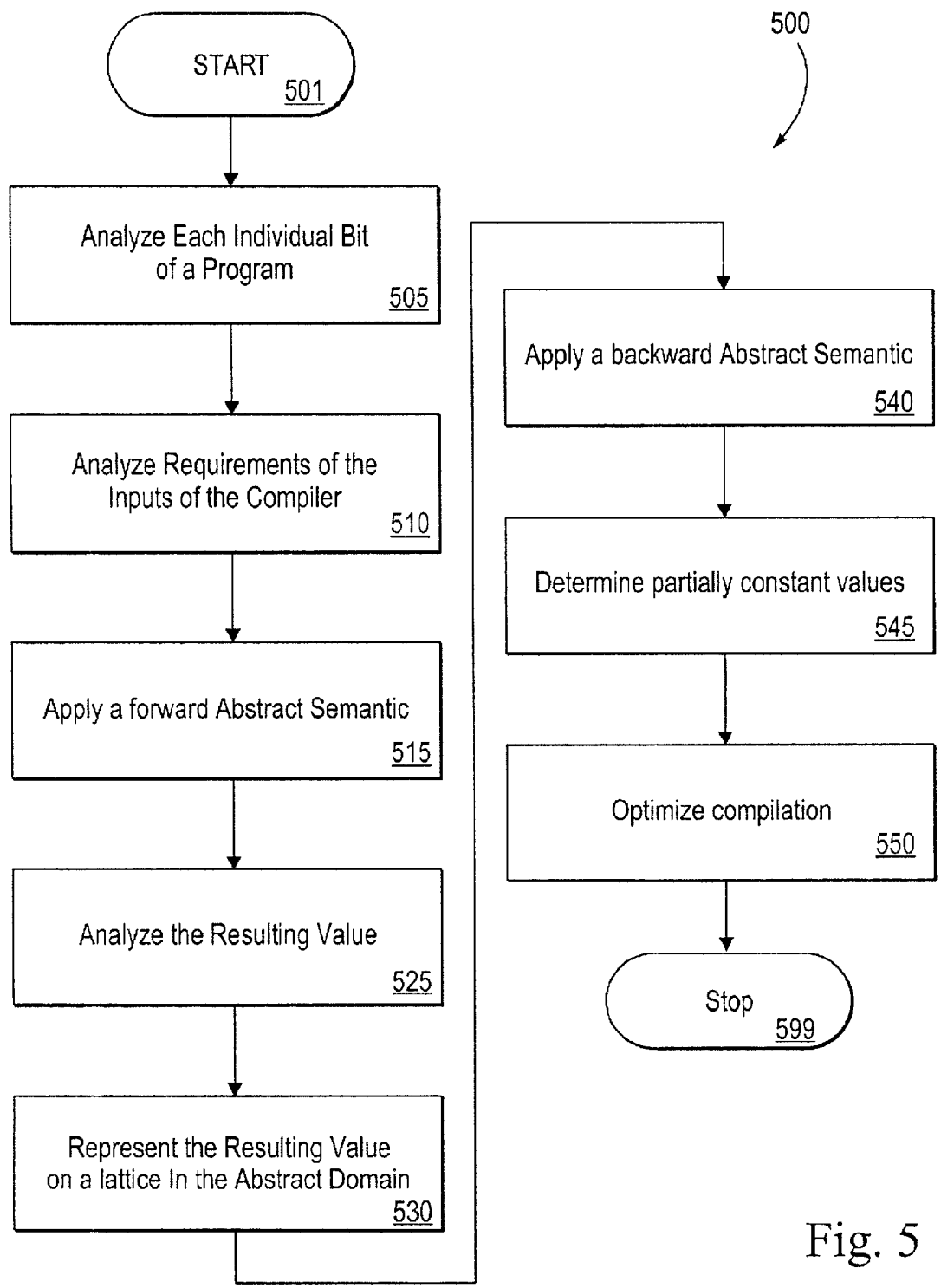
FIG. 5 illustrates a flow diagram of a method 500 for optimizing an implementation of a programming language.

According to one embodiment, FIG. 5 illustrates a flow diagram of a method 500 for optimizing an implementation of a programming language. The implementation of a programming language that is optimized may be an assembly language compiler, C compiler, C++ compiler, Computer Aided Design compiler or similar compilation mechanism. With compilers such as these, one or more values are generally computed by a program written in the programming language. The process begins at start block 501. At processing block 505, each bit of the program is analyzed separately including representing each bit within a value of the one or more values as an abstract element of a lattice having a set of abstract elements including $0_A$, $1_A$, $\perp_A$ and $T_A$. The lattice is an abstraction of a concrete domain containing 0, 1, and $\perp$. In one embodiment, the analysis of each bit occurs concurrently or in parallel, wherein another embodiment, a batch analysis of bits is performed, but still on a bit-by-bit basis. Flow continues to processing block 510 where the process analyzes the requirements of the inputs of the compiler including analyzing the input bits that are input to an operation in terms of the output bits that are produced by the operation. For example, the inputs may be defined (either 0 or 1) or the inputs may be undefined ($\perp$). In addition, in the concrete domain, the operation performed on the inputs may be boolean functions such as AND, OR, and NOT, or complex boolean functions.

At processing block 515, a forward abstract semantic is applied to the inputs. The forward abstract semantic is associated with the forward concrete semantic (boolean operation), to provide an abstract result from the concrete inputs. The abstract result is an approximation of a more exact meaning that is generally computed by a compiler. For example, if the exact meaning is a floating point number, the result could be the exact meaning rounded up to the nearest integer. Flow continues to processing block 525 where the resulting value is analyzed for each forward abstract semantic performed on the inputs, including analyzing one or more output bits that are produced by an operation in terms of one or more input bits that are input to the operation. Knowing what forward abstract semantic was applied to the inputs, the method determines if an alternate set of inputs may be used to generate the same exact result value. Thus, alternate input values are generated.

In processing block 530, the resulting abstract value is represented on an abstract lattice having the elements $0_A$, $1_A$, $\perp_A$ and $T_A$. The abstract lattice is an abstraction of a concrete domain having the elements 0, 1, and $\perp$. A backward abstract semantic is applied at processing block 540. The backward semantic is an approximation of a backward concrete semantic including $AND^{-1}$, $OR^{-1}$, and $NOT^{-1}$ (or other complex boolean backward semantics). The result of the abstract backward semantic is a set of inputs that may be different than the original inputs, but that will provide the same result.

Flow continues to processing block 545 where the inputs are analyzed to determine if they are partially constant values (as described above). At processing block 550, the compilation is optimized. For example, inputs that do not contribute to the result can be discarded. The process ends at block 599.

In an alternate embodiment, the method proceeds in two phases. In the first phase, a bipartite graph G is built over the aliases and PUT statements of the program. This graph expresses the flow of values between statements of the program. G is a kind of dependence flow graph. This graph can be either intraprocedural or interprocedural in scope, and the method operates intraprocedurally or interprocedurally accordingly.

In the second phase, the method maintains a set of nodes of G which are ready for processing. It then repeatedly removes and processes nodes from this set until the set is empty. If a processed node is a PUT statement, it evaluates the statement (by symbolically executing it), updates the abstract value associated with an alias of the PUT, and adds the alias to the working set if the updated value for the alias has changed. If the processed node is an alias, the method simply adds its successors in G to the set for evaluation.

Bitwise Constant Propogation Method

Let S be the number of PUT statements in the program. Let A be the number of aliases associated with the GETs and PUTs of the program. Let N=S+A. Let G be a graph on N nodes (with no edges initially), and let there be a one-to-one correspondence between the nodes of G and the PUT statements and aliases of the program. Let Q be a set of nodes of G, initially empty.

AbstractValue ForwardValue [A];

AbstractValue BackwardValue [A];

Phase 1
    For each alias M:
        add an edge to G from the node corresponding to each PUT statement whose alias is M to the node corresponding to M
        add an edge to G from the node corresponding to M to the node corresponding to each PUT statement that contains a GET whose alias is M Phase 2
    For each alias M:
        ForwardValue[M]=InitialForwardValue(M)
        Add the node corresponding to M to Q.
    While Q is nonempty, do:
        Let n be an element of Q. Remove n from Q.
        If n corresponds to an alias, add the successors of n in G to Q.
        If n corresponds to a statement of the form (PUT A E1), do:
            let V=Eval_forward(E1)
            if not(LE(V, ForwardValue[A])) then
            ForwardValue[A]=JOIN(ForwardValue[A], V)
            Add A to Q Phase 3
    For each alias M:
        BackwardValue[M]=InitialBackwardValue(M)
        Add the nodes corresponding to M to Q.
    While Q is nonempty, do:
        Let n be an element of Q. Remove n from Q.
        If n corresponds to an alias, add the predecessors of n in G to Q.
        If n corresponds to a statement of the form (PUT A E1), do:
            let V=BackwardValue[A]
            Eval_backward(E1, V)

end Bitwise Constant Propogation Method

The ForwardValue for each alias M is set to InitialForwardValue(M) at the outset of phase 2. The InitialForwardValue for an alias must reflect the initial state of memory for that alias and/or assignments to the alias that occur outside of and prior to the program text under analysis. For example, if the alias represents a memory location(s) that may be initialized statically, the InitialForwardValue for that alias must be high enough to represent the value of the static initializers. Similarly, the BackwardValue for each alias M is set to InitialBackwardValue(M) at the outset of phase 3. InitialBackwardValue for an alias must reflect any final uses for the alias, i.e., references that occur outside of and following the program text under analysis. For example, if an alias represents a global variable that may be read after execution of the program fragment being analyzed, then InitialBackwardValue for that alias must be high enough to represent the demand imposed by the use.

AbstractValue Eval_forward (Expression E)

```
{
case E of
    (BITAND E1 E2):
        return BitAnd(Eval_forward(E1), Eval_forward(E2))
    (BITOR E1 E2):
        return BitOr(Eval_forward(E1), Eval_forward(E2))
    (BITNOT E1):
        return BitNot(Eval_forward(E1))
    (LEFT E1 E2):
        return Left(Eval_forward(E1), Eval_forward(E2))
    (SRIGHT E1 E2):
        return SRight(Eval_forward(E1), Eval_forward(E2))
    (URIGHT E1 E2):
        return URight(Eval_forward(E1), Eval_forward(E2))
    (GET [T] A):
        return ForwardValue[A]
}
``` void Eval_backward(Expression E, AbstractValue F)

```
{
AbstractValue V1, V2
case E of
    (BITAND E1 E2):
        V1 = Eval_Forward(E1)
        V2 = Eval_Forward(E2)
        BitAnd_inv(F, V1, V2)
        Eval_Backward(E1, V1)
        Eval_Backward(E2, V2)
    (BITOR E1 E2):
        V1 = Eval_Forward(E1)
        V2 = Eval_Forward(E2)
        BitOr_inv(F, V1, V2)
        Eval_Backward(E1, V1)
        Eval_Backward(E2, V2)
    (BITNOT E1):
        V1 = Eval_Forward(E1)
        BitNot_inv(F, V1)
        Eval_Backward(E1, V1)
    (LEFT E1 E2):
        V1 = Eval_Forward(E1)
        Left_inv(F, V1)
        Eval_Backward(E1, V1)
    (SRIGHT E1 E2):
        V1 = Eval_Forward(E1)
        SRight_inv(F, V1)
        Eval_Backward(E1, V1)
    (URIGHT E1 E2):
        V1 = Eval_Forward(E1)
        URight_inv(F, V1)
        Eval_Backward(E1, V1)
    (GET [T] A):
        if not(LE(F, Backward Value[A])) then
            Backward Value[A] = JOIN(BackwardValue[A], F)
            Add A to Q
}
```

Note that the size of G (nodes+edges) is linear in the program text size. This follows from the fact that number of aliases in the program is less than the combined number of GETs and PUTs in the program, and hence the number of nodes in the graph is fewer than the number of GETs plus twice the number of PUTs in the program. The number of edges in G is no greater than the number of GETs plus the number of PUTs in the program.

EXAMPLE

Consider the following program in a C-like notation:
extern unsigned a, b, c, d, e, f;
static unsigned v, w, x, y, z;
v=a;
w=(v & 0xFFF0)|(b & 0x000F);

x=(w & 0xFF0F)|(c & 0x00F0);

y=(x & 0xF0FF)|(d & 0x0F00);

z=(y & 0x0FFF)|(e & 0xF000);

f=z;

Variables a through f are external, and are assigned initial forward and backward values of top ($T_A T_A \ldots T_A$) to represent their initial definitions and final uses. Variables v through z are static (local), and we will assign them initial forward and backward values are assigned of bottom ($\perp_A \perp_A \ldots \perp_A$). This program is translated into statements in our intermediate language as follows:

(PUT v (GET [16] a))

(PUT w (BITOR (BITAND (GET [16] v) (INTEGER [16] 0xFFF0))

(BITAND (GET [16] b) (INTEGER [16]0x000F))))

(PUT x (BITOR (BITAND (GET [16] w) (INTEGER [16] 0xFF0F))

(BITAND (GET [16] c) (INTEGER [16] 0x00F0))))

(PUT y (BITOR (BITAND (GET [16] x) (INTEGER [16] 0xF0FF))

(BITAND (GET [16] d) (INTEGER [16] 0x0F00))))

(PUT z (BITOR (BITAND (GET [16] y) (INTEGER [16] 0x0FFF))

(BITAND (GET [16] e) (INTEGER [16] 0xF000))))

(PUT f (get [16] z))

The variable names themselves, are used as aliases, since there are no interesting alias relations in this program.

Bitwise Constant Propogation Method computes a ForwardValue of all top bits ($T_A T_A T_A T_A\ T_A T_A T_A T_A\ T_A T_A T_A T_A\ T_A T_A T_A T_A$) for all 11 of the aliases in the program. It computes the following BackwardValue array:

BackwardValue[a]=
$T_A T_A T_A T_A T_A T_A T_A T_A T_A T_A T_A T_A T_A T_A T_A T_A$ BackwardValue[b]=
$T_A T_A T_A T_A T_A T_A T_A T_A T_A T_A T_A T_A T_A T_A T_A T_A$ BackwardValue[c]=
$T_A T_A T_A T_A T_A T_A T_A T_A T_A T_A T_A T_A T_A T_A T_A T_A$ BackwardValue[d]=
$T_A T_A T_A T_A T_A T_A T_A T_A T_A T_A T_A T_A T_A T_A T_A T_A$ BackwardValue[e]=
$T_A T_A T_A T_A T_A T_A T_A T_A T_A T_A T_A T_A T_A T_A T_A T_A$ BackwardValue[f]=
$T_A T_A T_A T_A T_A T_A T_A T_A T_A T_A T_A T_A T_A T_A T_A T_A$ BackwardValue[v]=$\perp_A \perp_A \perp_A \perp_A\ \perp_A \perp_A \perp_A \perp_A\ \perp_A \perp_A \perp_A \perp_A\ \perp_A \perp_A \perp_A \perp_A$ BackwardValue[w]=$\perp_A \perp_A \perp_A \perp_A\ \perp_A \perp_A \perp_A \perp_A\ \perp_A \perp_A \perp_A \perp_A\ T_A T_A T_A T_A$ BackwardValue[x]=$\perp_A \perp_A \perp_A \perp_A\ \perp_A \perp_A \perp_A \perp_A\ T_A T_A T_A T_A\ T_A T_A T_A T_A$ BackwardValue[y]=$\perp_A \perp_A \perp_A \perp_A\ T_A T_A T_A T_A T_A T_A T_A T_A T_A T_A T_A T_A$ BackwardValue[z]=
$T_A T_A T_A T_A T_A T_A T_A T_A T_A T_A T_A T_A T_A T_A T_A T_A$ The method therefore reveals that variable v is unused by the computation.

Extensions and Applications

The method can be applied to virtually any operation that is a combinator of values (as opposed to, for example, an operation that reads the time or that has internal state). It is not necessary to use the most accurate (lowest) approximation of an operator in the forward direction; any approximation that produces a result that is at least as high as the lowest abstraction thereof is correct. To be specific, it is suggested that $$f(x) \sqsubseteq g(x)$$

where f is the least approximation of the operation and g is a less precise but still correct approximation. It is important however that the approximation used for an operator in the forward direction be consistent with that used in the backward direction. If h is the inverse (backward semantics) of an operator, then we must have that $$x \sqsubseteq g(h(x))$$

where g is the chosen approximation of the operator in the forward direction. To see why, consider a simple pair of assignments (PUT y (INTEGER [16] 0x0000)) (PUT x (BITAND y 0x0000)). Suppose an approximation is used of BITAND that produces a $\perp$ bit in any position where either of its inputs is $\perp$; but that the backward semantics for BITAND that is based on our discussion above is continued to be used, and therefore that delivers $\perp$ backward values from some non-$\perp$ outputs. In a first analysis, it maybe concluded that y has a backward value of all $\perp$ bits; that is, that y is unused. Its assignment may be deleted. If done however, a second analysis would conclude that x is undefined, whereas the original program clearly assigned x a value of 0x0000.

The method can be applied to an intermediate language in SSA form. In this case, a phi node is interpreted as a JOIN in the forward semantics, and as a simple transmitter of backward values in the backward analysis (the forward value for each input to the phi function is met (via $\sqcap$) with the backward value for the phi to produce the backward value for the input).

It is straightforward to make this analysis conditional in the same sense that conditional constant propagation methods are conditional; namely, assignments that are guarded by conditionals are not activated until it is determined that the predicates that guard them are true. Method BCP can be trivially modified, by adding a notion of activated nodes in G, to provide this additional power.

A method and system for bidirectional bitwise constant propagation by abstract interpretation is disclosed. Although the present invention has been described with respect to specific examples and subsystems, it will be apparent to those of ordinary skill in the art that the invention is not limited to these specific examples or subsystems but extends to other embodiments as well. The present invention includes all of these other embodiments as specified in the claims that follow.

We claim:

1. A method, comprising:
   optimizing an implementation of a programming language, comprising;
   analyzing one or more values computed by a program written in the programming language, wherein analyzing one or more values comprises;
   representing each bit within a value of the one or more values as an abstract element of a lattice having a set of abstract elements including $0_A$, $1_A$, $\perp_A$ and $T_A$, wherein the lattice is an abstraction of a concrete domain containing 0, 1, an $\perp$;
   analyzing one or more output bits that are produced by an operation in terms of one or more input bits that are input to the operation; and
   analyzing the input bits that are input to the operation in terms of the output bits that are produced by the operation.

2. The method of claim 1, wherein optimizing further comprises:
applying a forward abstract semantic to the abstract element; and
applying a backward abstract semantic to the abstract element;
wherein the forward abstract semantic is an approximation of a forward concrete semantic including AND, OR, and NOT; and
wherein the backward abstract semantic is an approximation of a backward concrete semantic including $AND^{-1}$, $OR^{-1}$, and $NOT^{-1}$.

3. The method of claim 2, further comprising:
identifying the values within the program as partially constant values.

4. The method of claim 3, wherein the backward abstract semantic is for a complex boolean function including $LEFT^{-1}$, $URIGHT^{-1}$, $JOIN^{-1}$, $MEET^{-1}$, $LE^{-1}$ and $SRIGHT^{-1}$, and wherein the forward abstract semantic is for the complex boolean function including LEFT, URIGHT, JOIN, MEET, LE, and SRIGHT.

5. The method of claim 4, wherein the program is represented in an intermediate language.

6. The method of claim 5, wherein the implementation is a compiler for the programming language.

7. The method of claim 5, wherein the implementation is a computer aided design compiler for the programming language.

8. A computer-readable medium having stored thereon a plurality of instructions, said plurality of instructions when executed by a computer, cause said computer to perform:
optimizing an implementation of a programming language, comprising:
analyzing one or more values computed by a program written in the programming language, wherein analyzing one or more values comprises:
representing each bit within a value of the one or more values as an abstract element of a lattice having a set of abstract elements including $0_A$, $1_A$, $\perp_A$ and $T_A$, wherein the lattice is an abstraction of a concrete domain containing 0, 1, and $\perp$;
analyzing one or more output bits that are produced by an operation in terms of one or more input bits that are input to the operation; and
analyzing the input bits that are input to the operation in terms of the output bits that are produced by the operation.

9. The computer-readable medium of claim 8 having stored thereon additional instructions, said additional instructions when executed by a computer for optimizing, cause said computer to further perform:
applying a forward abstract semantic to the abstract element; and
applying a backward abstract semantic to the abstract element;
wherein the forward abstract semantic is an approximation of a forward concrete semantic including AND, OR, and NOT; and
wherein the backward abstract semantic is an approximation of a backward concrete semantic including $AND^{-1}$, $OR^{-1}$, and $NOT^{-1}$.

10. The computer-readable medium of claim 9 having stored thereon additional instructions, said additional instructions when executed by a computer, cause said computer to further perform:
identifying the values within the program as partially constant values.

11. The computer-readable medium of claim 10, wherein the backward abstract semantic is for a complex boolean function including $LEFT^{-1}$, $URIGHT^{-1}$, $JOIN^{-1}$, $MEET^{-1}$, $LE^{-1}$ and $SRIGHT^{-1}$, and wherein the forward abstract semantic is for the complex boolean function including LEFT, URIGHT, JOIN, MEET, LE, and SRIGHT.

12. The computer-readable medium of claim 11, wherein the program is represented in an intermediate language.

13. The computer-readable medium of claim 11, wherein the implementation is a computer aided design compiler for the programming language.

14. A system, comprising:
a processor;
memory connected to the processor storing instructions for bidirectional bitwise constant propogation by abstract interpretation executed by the processor;
storage connected to the processor that stores a software program having a plurality of separately compilable routines,
wherein the processor optimizes an implementation of a programming language, by
analyzing one or more values computed by a program written in the programming language, wherein analyzing one or more values comprises;
representing each bit within a value of the one or more values as an abstract element of a lattice having a set of abstract elements including $0_A$, $1_A$, $\perp_A$ and $T_A$, wherein the lattice is an abstraction of a concrete domain containing 0, 1, and $\perp$;
analyzing one or more output bits that are produced by an operation in terms of one or more input bits that are input to the operation; and
analyzing the input bits that are input to the operation in terms of the output bits that are produced by the operation.

15. The system of claim 14, wherein the processor further optimizes by applying a forward abstract semantic to the abstract element; and
applying a backward abstract semantic to the abstract element;
wherein the forward abstract semantic is an approximation of a forward concrete semantic including AND, OR, and NOT; and
wherein the backward abstract semantic is an approximation of a backward concrete semantic including $AND^{-1}$, $OR^{-1}$, and $NOT^{-1}$.

16. The system of claim 15, wherein the processor identifies the values within the program as partially constant values.

17. The system of claim 16, wherein the backward abstract semantic is for a complex boolean function including $LEFT^{-1}$, $URIGHT^{-1}$, $JOIN^{-1}$, $MEET^{-1}$, $LE^{-1}$ and $SRIGHT^{-1}$, and wherein the forward abstract semantic is for the complex boolean function including LEFT, URIGHT, JOIN, MEET, LE, and SRIGHT.

18. The system of claim 17, wherein the program is represented in an intermediate language.

19. The system of claim 18, wherein the implementation is a compiler for the programming language.

20. The system of claim 19, wherein the implementation is a computer aided design compiler for the programming language.

21. A system, comprising:

means for optimizing an implementation of a programming language, comprising;

means for analyzing one or more values computed by a program written in the programming language, wherein analyzing one or more values comprises;

means for representing each bit within a value of the one or more values as an abstract element of a lattice having a set of abstract elements including $0_A$, $1_A$, $\perp_A$ and $T_A$, wherein the lattice is an abstraction of a concrete domain containing 0, 1, and $\perp$;

means for analyzing one or more output bits that are produced by an operation in terms of one or more input bits that are input to the operation; and means for analyzing the input bits that are input to the operation in terms of the output bits that are produced by the operation.

22. The system of claim 21, wherein the means for optimizing further comprises:

means for applying a forward abstract semantic to the abstract element; and means for applying a backward abstract semantic to the abstract element;

wherein the forward abstract semantic is an approximation of a forward concrete semantic including AND, OR, and NOT; and wherein the backward abstract semantic is an approximation of a backward concrete semantic including $AND^{-1}$, $OR^{-1}$, and $NOT^{-1}$.

23. The system of claim 22, further comprising:

means for identifying the values within the program as partially constant values.

24. The system of claim 23, wherein the backward abstract semantic is for a complex boolean function including $LEFT^{-1}$, $URIGHT^{-1}$, $JOIN^{-1}$, $MEET^{-1}$, $LE^{-1}$ and $SRIGHT^{-1}$, and wherein the forward abstract semantic is for the complex boolean function including LEFT, URIGHT, JOIN, MEET, LE, and SRIGHT.

25. The system of claim 24, wherein the program is represented in an intermediate language.

26. The system of claim 25, wherein the implementation is a compiler for the programming language.

27. The system of claim 26, wherein the implementation is a computer aided design compiler for the programming language.

* * * * *